(12) United States Patent
Holmes et al.

(10) Patent No.: US 9,607,061 B2
(45) Date of Patent: *Mar. 28, 2017

(54) USING VIEWS OF SUBSETS OF NODES OF A SCHEMA TO GENERATE DATA TRANSFORMATION JOBS TO TRANSFORM INPUT FILES IN FIRST DATA FORMATS TO OUTPUT FILES IN SECOND DATA FORMATS

(71) Applicant: International Business Machines Corporation, Armonk, NY (US)

(72) Inventors: John C. Holmes, Stratham, NH (US); Ming Jiang, Cary, NC (US); Jeff J. Li, Boca Raton, FL (US); Yong Li, Newton, MA (US); David S. Sotkowitz, Sharon, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,328

(22) Filed: Mar. 11, 2015

(65) Prior Publication Data

US 2015/0186482 A1    Jul. 2, 2015

Related U.S. Application Data

(63) Continuation of application No. 14/070,468, filed on Nov. 1, 2013, now Pat. No. 9,009,173, which is a (Continued)

(51) Int. Cl.
*G06F 17/30* (2006.01)
*G06F 17/22* (2006.01)

(52) U.S. Cl.
CPC .... *G06F 17/30563* (2013.01); *G06F 17/2247* (2013.01); *G06F 17/30017* (2013.01);
(Continued)

(58) Field of Classification Search
CPC ............ G06F 17/2247; G06F 17/2705; G06F 17/30017; G06F 17/3092; G06F 17/30076;
(Continued)

(56) References Cited

U.S. PATENT DOCUMENTS 5,999,187 A    12/1999 Dehmlow et al.
6,204,850 B1    3/2001 Green
(Continued)

OTHER PUBLICATIONS

Foster et al., Annotated XML: queries and provenance, Jun. 9-12, 2008, ACM, 271-280.*

(Continued)

*Primary Examiner* — Jean B Fleurantin
(74) *Attorney, Agent, or Firm* — David W. Victor; Konrad, Raynes, Davda & Victor LLP

(57) ABSTRACT

Provided is a method for processing input data in a storage system and in communication with a repository. Views are generated that comprise a tree of nodes selected from a subset of nodes in a hierarchical representation of a schema. The views are saved to the repository. At least one of the views are used to create a job comprising a sequence of data transformation steps to transform the input data described by input schemas to the output data described by output schemas.

20 Claims, 21 Drawing Sheets

Related U.S. Application Data continuation of application No. 13/401,679, filed on Feb. 21, 2012, now abandoned, which is a continuation of application No. 13/358,426, filed on Jan. 25, 2012, now Pat. No. 8,732,178.

(52) U.S. Cl.
CPC .... *G06F 17/30076* (2013.01); *G06F 17/3092* (2013.01); *G06F 17/30327* (2013.01); *G06F 17/30923* (2013.01)

(58) Field of Classification Search
CPC ......... G06F 17/30563; G06F 17/30923; G06F 17/30327
USPC ................ 707/755, 778, 797, 802–812, 828; 715/234, 853
See application file for complete search history.

(56) References Cited

U.S. PATENT DOCUMENTS

| | | | |
|---|---|---|---|
| 6,912,538 | B2 | 6/2005 | Stapel et al. |
| 7,043,487 | B2 | 5/2006 | Krishnamurthy et al. |
| 7,877,416 | B2 | 1/2011 | Chari et al. |
| 8,150,893 | B2 | 4/2012 | Bohannon et al. |
| 8,209,361 | B2 | 6/2012 | Idicula et al. |
| 8,732,178 | B2 | 5/2014 | Holmes et al. |
| 8,762,424 | B2 | 6/2014 | Holmes et al. |
| 2001/0051948 | A1 | 12/2001 | Srinivasan et al. |
| 2002/0059566 | A1 | 5/2002 | Delcambre et al. |
| 2002/0087571 | A1 | 7/2002 | Stapel et al. |
| 2003/0204481 | A1 | 10/2003 | Lau |
| 2004/0015783 | A1 | 1/2004 | Lennon et al. |
| 2004/0044959 | A1 | 3/2004 | Shanmugasundaram et al. |
| 2004/0128296 | A1 | 7/2004 | Krishnamurthy et al. |
| 2006/0129583 | A1 | 6/2006 | Catorcini et al. |
| 2006/0282442 | A1* | 12/2006 | Lennon et al. ............... 707/100 |
| 2007/0073734 | A1 | 3/2007 | Doan et al. |
| 2007/0083538 | A1 | 4/2007 | Roy et al. |
| 2007/0143321 | A1 | 6/2007 | Meliksetian et al. |
| 2007/0143331 | A1 | 6/2007 | Holtz et al. |
| 2008/0134139 | A1 | 6/2008 | Krouse et al. |
| 2009/0006316 | A1 | 1/2009 | Fan et al. |
| 2009/0144293 | A1 | 6/2009 | Chowdhury |
| 2009/0248588 | A1 | 10/2009 | Hadi et al. |
| 2009/0249189 | A1 | 10/2009 | Jania et al. |
| 2010/0057760 | A1 | 3/2010 | Demant et al. |
| 2010/0235725 | A1 | 9/2010 | Drayton et al. |
| 2013/0191404 | A1 | 7/2013 | Holmes et al. |
| 2013/0191419 | A1 | 7/2013 | Holmes et al. |
| 2013/0191421 | A1 | 7/2013 | Holmes et al. |
| 2013/0191780 | A1 | 7/2013 | Holmes et al. |
| 2014/0059064 | A1 | 2/2014 | Holmes et al. |

OTHER PUBLICATIONS

Alur, N., C. Takahashi, S. Toratani, and D. Vasconcelos, "IBM InfoSphere DataStage Data Flow and Job Design", Jul. 2008, First Edition, © International Business Machines Corporation 2008, Total 658 pp.

Barnak, B., A. Bar-Or, C.M. Saracco, and P. Stanley, "IBM InfoSphere DataStage and DB2 pureXML, Part 1: Integrate XML Operational Data into a Data Warehouse", Aug. 20, 2009, © IBM Corporation 2009, Total 35 pp.

Barnak, B., A. Bar-Or, C.M. Saracco, and P. Stanley, "IBM InfoSphere DataStage and DB2 pureXML, Part 2: Building an XML-enabled Data Warehouse", Sep. 3, 2009, © IBM Corporation 2009, Total 19 pp.

Bar-Or, A. and S. Choudhary, "Using the XML Transformation Capabilities in IBM InfoSphere DataStage 8.5, Part 1: Transform XML Using the DataStage XML Stage: New Capabilities Parsin and Composing XML Files", © IBM Corporation 2011, Total 24 pp.

Bar-Or, A. and S. Choudhary, "Using the XML Transformation Capabilities in IBM InfoSphere DataStage 8.5, Part 2: Understanding the Assembly", © IBM Corporation 2011, Total 27 pp.

Bar-Or, A., and S. Choudhary, "Using the XML Transformation Capabilities in IBM InfoSphere DataStage 8.5, Part 3: Understanding Validation Rules", Apr. 28, 2011, IBM Corporation 2011, Total 17 pp.

Chen, L., X. Xiong, and D. Zhang, "Transform and Integrate Data Using WebSphere DataStage XML and Web Services Packs", Mar. 29, 2007, [online], [Retrieved on Jan. 5, 2012]. Retrieved from the Internet at <URL: http://www.ibm.com/developerworks/data/library/techarticle/dm-0703xiong/>, Total 35 pp.

Xi, H. et al., "Distributed Supply Chain Simulation Using a Generic Job Running Framework", In Proceedings of the 2003 Winter Simulation Conference, 2003, 8 pp.

Office Action 1 for U.S. Appl. No. 13/358,421, dated Mar. 15, 2013, 20 pp.

Amendment 1 for U.S. Appl. No. 13/358,421, dated Jun. 10, 2013, 14 pp.

Notice of Allowance 1 for U.S. Appl. No. 13/358,421, dated Aug. 21, 2013, 17 pp.

Notice of Allowance 2 for U.S. Appl. No. 13/358,421, dated Oct. 11, 2013, 16 pp.

Office Action 1 for U.S. Appl. No. 13/401,614, dated Apr. 4, 2013, 16 pp.

Amendment 1 for U.S. Appl. No. 13/401,614, dated Jun. 10, 2013, 9 pp.

Notice of Allowance 1 for U.S. Appl. No. 13/401,614, dated Aug. 20, 2013, 17 pp.

Notice of Allowance 2 for U.S. Appl. No. 13/401,614, dated Oct. 25, 2013, 16 pp.

Office Action 1 for U.S. Appl. No. 13/358,426, dated Mar. 25, 2013, 17 pp. .

Notice of Allowance 1 for U.S. Appl. No. 13/358,426, dated Sep. 4, 2013, 18 pp.

Response to Office Action 1 for U.S. Appl. No. 13/358,426, dated Jun. 25, 2013, 7 pp.

Office Action 1 for U.S. Appl. No. 13/401,679, dated Mar. 25, 2013, 15 pp.

Response to Office Action 1 for U.S. Appl. No. 13/401,679, dated Jun. 25, 2013, 5 pp.

Notice of Allowance for U.S. Appl. No. 13/401,679, dated Aug. 30, 2013, 15 pp.

Chen, W., et al., "DB2 9 pureXML Guide", IBM Redbook, Jan. 2007, 35 pp.

Foster, J.N., T.J. Green, and V. Tannen, "Annotated XML: Queries and Provenance", PODS'08, Jun. 9-12, 2008, Vancouver, BC, Canada, © 2008, ACM, Total 10 pp.

IBM Corp., "Annotated XML Schema Decomposition and Recursive XML Documents", DB2 Version 9.5 for Linux, UNIX, and Windows, [online], [Retrieved on Aug. 18, 2013]. Retrieved from the Internet at <URL: http://publib.boulder.ibm.com/infocenter/db2luw/v9r5/index.jsp?topic=%2Fcom.ibm.db2.luw.wn.doc%2Fdoc%2Fc0050661.html>, 5 pp.

Wikibooks, "XML—Managing Data Exchange/Recursive Relationships", [online], [Retrieved on Aug. 18, 2013]. Retrieved from the Internet at <URL: http://en.wikibooks.org/wiki/XML_-_Managing_Data_Exchange/Recurs>, 6 pp.

Amendment 2, Jan. 10, 2014, for U.S. Appl. No. 13/358,421, filed on Jan. 25, 2012 by J.C. Holmes et al., Total pp.

Notice of Allowance 3, Feb. 19, 2014, for U.S. Appl. No. 13/358,421, filed on Jan. 25, 2012 by J.C. Holmes et al., Total 15 pp.

Amendment 2 for U.S. Appl. No. 13/358,426, dated Dec. 4, 2013, 8 pp.

Notice of Allowance 2 for U.S. Appl. No. 13/358,426, dated Dec. 24, 2013, 14 pp.

Office Action 1, Feb. 13, 2014, for U.S. Appl. No. 14/070,468, filed on Nov. 1, 2013 by J.C. Holmes et al., Total 13 pp.

Final Office Action 1, Jul. 16, 2014, for U.S. Appl. No. 14/070,468, filed on Nov. 1, 2013 by J.C. Holmes et al., Total 16 pp.

(56) References Cited

OTHER PUBLICATIONS

Supplemental Amendment to Final Office Action 1, Oct. 16, 2014, for U.S. Appl. No. 14/070,468, filed on Nov. 1, 2013 by J.C. Holmes et al., Total 6 pp.
Notice of Allowance, Dec. 5, 2014, for U.S. Appl. No. 14/070,468, filed on Nov. 1, 2013 by J.C. Holmes et al., Total 11 pp.
US Application for Docket No. SVL920130071US1, filed Jan. 6, 2014, entitled "Limiting the Rendering of Instances of Recursive Elements in View Output", by Fischer, J.M., et al., 39 pp.
Preliminary Amendment, Nov. 4, 2014, for U.S. Appl. No. 14/148,646, filed on Jan. 6, 2014 by J.M. Fischer et al., Total 8 pp.
US Application for Docket No. SVL920130123US1, filed Jan. 6, 2014, entitled "Generating a View for a Schema Including Information on Indication to Transform Recursive Types to Non-Recursive Structure in the Schema", by Fischer, J.M., et al., 38 pp.
Preliminary Amendment, Nov. 18, 2014, for U.S. Appl. No. 14/148,624, filed on Jan. 6, 2014 by J.M. Fischer et al., Total 6 pp.
U.S. Appl. No. 14/533,019 filed Nov. 4, 2014, entitled "Limiting the Rendering of Instances of Recursive Elements in View Output", by Fischer, J.M., et al., Total 39 pp.
Preliminary Amendment, Nov. 4, 2014, for U.S. Appl. No. 14/533,019, filed on Nov. 4, 2014 by J.M. Fischer et al., Total 7 pp.
US Application for Docket No. SVL920130123US2, filed Nov. 18, 2014, entitled "Generating a View for a Schema Including Information on Indication to Transform Recursive Types to Nonrecursive Structure in the Schema", by Fischer, J.M., et al., Total 38 pp.
Preliminary Amendment, Nov. 18, 2014, for U.S. Appl. No. 14/546,975, filed on Nov. 18, 2014 by J.M. Fischer et al., Total 6 pp.
Office Action 1, Oct. 14, 2015, for U.S. Appl. No. 14/148,624, filed on Jan. 6, 2014 by J.M. Fischer et al., Total 8 pp.
Response to Office Action 1, Jan. 14, 2016, for U.S. Appl. No. 14/148,624, tiled on Jan. 6, 2014 by J.M. Fischer et al., Total 10 pp.
Office Action 1, Feb. 16, 2016, for U.S. Appl. No. 14/533,018, filed on Nov. 4, 2014 by J.M. Fischer et al., Total 34 pp.
Office Action 1, Feb. 25, 2016, for U.S. Appl. No. 14/148,646, filed on Jan. 6, 2014 by J.M. Fischer et al., Total 45 pp.
Response to Office Action 1, May 25, 2016, for U.S. Appl. No. 14/148,646, filed on Jan. 6, 2014 by J.M. Fischer et al., Total 12 pp.
Office Action 2, May 6, 2016, for U.S. Appl. No. 14/148,624, filed on Jan. 6, 2014 by J.M. Fischer et al., Total 11 pp.
Response to Office Action 1, May 16, 2016, for U.S. Appl. No. 14/533,019, filed on Nov. 4, 2014 by J.M Fischer et al., Total 9 pp.
U.S. Appl. No. 13/358,421, filed Jan. 25, 2012, entitled "Generating Views of Subsets of Nodes of a Schema", invented by Holmes, J.C., M. Jiang, J.J. Li, Y. Li, and D.S. Sotkowitz, Total 39 pp. [57.260].
U.S. Appl. No. 13/401,614, filed Feb. 21, 2012, entitled "Generating Views of Subsets of Nodes of a Schema", invented by Holmes, J.C., M. Jiang, J.J. Li, Y. Li, and D.S. Sotkowitz, Total 33 pp.
U.S. Appl. No. 13/358,426, filed Jan. 25, 2012, entitled "Using Views of Subsets of Nodes of a Schema to Generate Data Transformation Jobs to Transform Input Files in First Data Formats to Output Files in Second Data Formats", invented by Holmes, J.C., M. Jiang, J.J. Li, Y. Li, and D.S. Sotkowitz, Total 46 pp. [57.265].
U.S. Appl. No. 13/401,679, filed Feb. 21, 2012, entitled "Using Views of Subsets of Nodes of a Schema to Generate Data Transformation Jobs to Transform Input Files in First Data Formats to Output Files in Second Data Formats", invented by Holmes, J.C., M. Jiang, J.J. Li, Y. Li, and D.S. Sotkowitz, Total 43 pp.
U.S. Appl. No. 14/070,468, filed Nov. 1, 2013, entitled "Using Views of Subsets of Nodes of a Schema to Generate Data Transformation Jobs to Transform Input Files in First Data Formats to Output Files in Second Data Formats", by Holmes, J.C., et al., 46 pp.
Response to Office Action 2, Aug. 8, 2016, for U.S. Appl. No. 14/148,624, filed on Jan. 6, 2014 by J.M. Fischer et al., Total 13 pp.
Notice of Allowance, Sep. 12, 2016, for U.S. Appl. No. 14/148,646, filed on Jan. 6, 2014 by J.M. Fischer et al., Total 21 pp.
Notice of Allowance, Sep. 13, 2016, for U.S. Appl. No. 14/533,019, filed on Nov. 4, 2014 by J.M. Fischer et al., Total 17 pp.

\* cited by examiner

Hierarchical Representation of Input File

Data Transformation Job

Composer Data Transformation

```xml
<?xml version="1.0" encoding="UTF-8" ?>
<org:departments xmlns:org="http://ibm.com/infosphere/xml/Organization">
  <department departmentID="A100" departmentKind="Division">
    <manager>A7100</manager>
    <tns:employees xmlns:tns="http://ibm.com/infosphere/xml/Employee">
      <employee employeeID="A8990" departmentID="A100">
        <name>
          <firstName>Zen</firstName>
          <middleName>P</middleName>
          <lastName>Wright</lastName>
        </name>
        <gender>male</gender>
        <dateOfBirth>1980-04-04</dateOfBirth>
        <title>Mr</title>
        <address>
          <street>2301 East Lamar Blvd</street>
          <city>Arlington</city>
          <state>Texas</state>
          <country>USA</country>
          <postalCode>78363</postalCode>
          <address_type>0</address_type>
        </address>
        <address>
          <street>2001 West Street</street>
          <city>Arlington</city>
          <state>Texas</state>
          <country>USA</country>
          <postalCode>78300</postalCode>
          <address_type>H</address_type>
        </address>
        <hireDate>2008-07-11</hireDate>
        <Jobs>
          <job department="A100" id="1000" isManager="false">
            <jobTitle>Software Engineer</jobTitle>
            <StartDate>2008-07</startDate>
            <endDate>2010-12</endDate>
            <annualSalary>1200000</annualSalary>
            <currentjob>true</currentjob>
          </job>
          <job department="CF300" id="2000" isManager="false">
            <jobTitle>Associate Engineer</jobTitle>
            <startDate>2006-05</startDate>
            <endDate>2008-07</endDate>
            <annualSalary>600000</annualSalary>
            <currentjob>false</currentjob>
          </job>
        </Jobs>
      </employee>
      <employee employeeID="B6540" departmentID="A100">
        <name>
          <firstName>Cynthia</firstName>
          <middleName>P</middleName>
```

FIG. 16

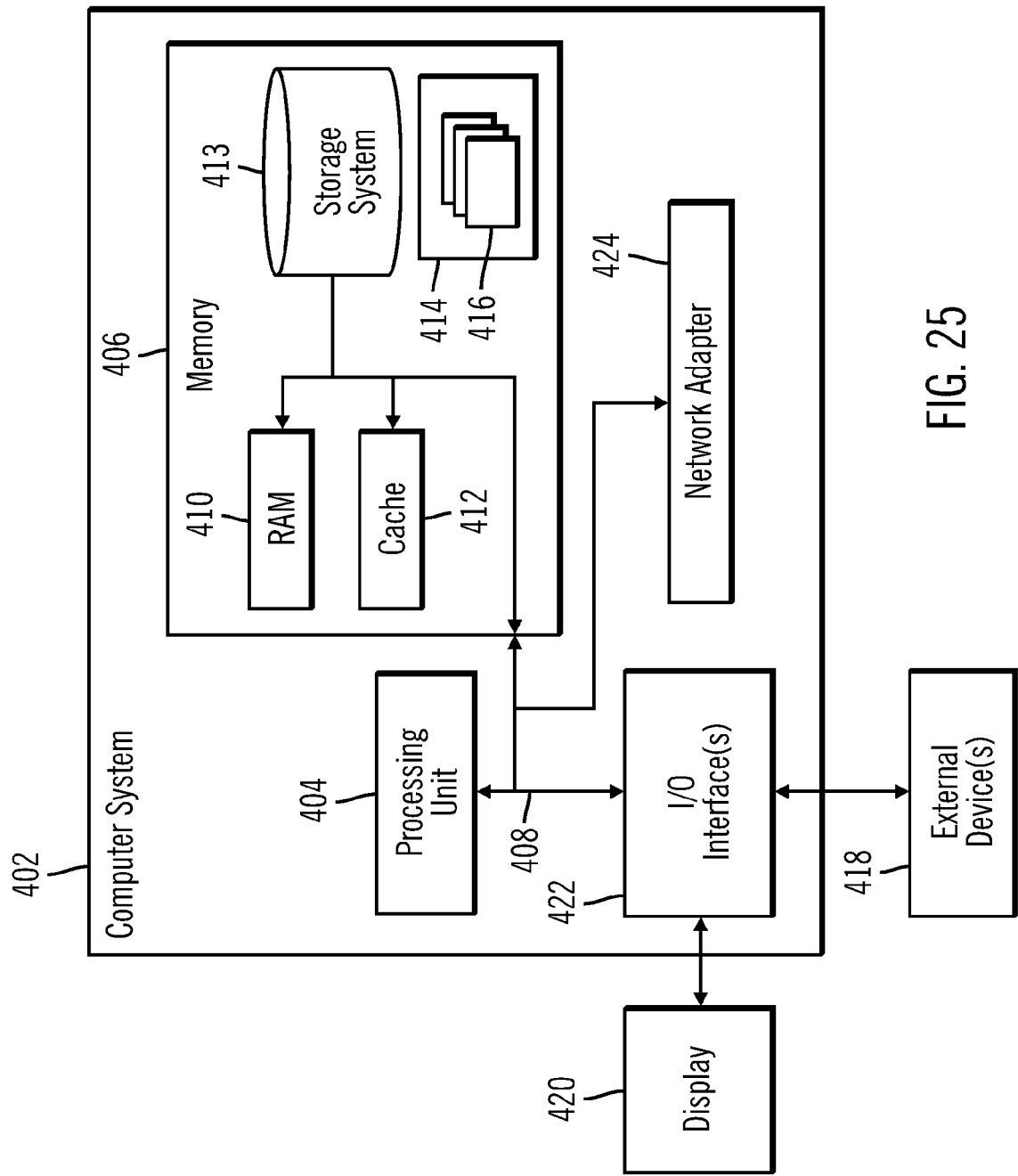

USING VIEWS OF SUBSETS OF NODES OF A SCHEMA TO GENERATE DATA TRANSFORMATION JOBS TO TRANSFORM INPUT FILES IN FIRST DATA FORMATS TO OUTPUT FILES IN SECOND DATA FORMATS

CROSS-REFERENCE TO RELATED APPLICATIONS

This application is a continuation of U.S. patent application Ser. No. 14/070,468, filed on Nov. 1, 2013, which is a continuation of U.S. patent application Ser. No. 13/401,679, filed on Feb. 21, 2012, which is a continuation of U.S. patent application Ser. No. 13/358,426, filed Jan. 25, 2012, which patent applications are incorporated herein by reference in their entirety.

BACKGROUND OF THE INVENTION

1. Field of the Invention

The present invention relates to a computer program product, system, and method for using views of subsets of nodes of a schema to generate data transformation jobs to transform input files in first data formats to output files in second data formats.

2. Description of the Related Art

An Extensible Markup Language (XML) schema is a description of elements in a document encoded using the XML language. The XML schema may also be used to define a data model, also known as a meta model comprising a definition of a hierarchical representation of nodes that represent the data and relationship of data content for a data model. XML schemas that define more complex data models may have 1000s of nodes arranged in a complex hierarchy of trees of nodes. A large scale schema may be comprised of multiple XML Schema Definition (XSD) files and provides a definition of large scale trees of nodes and data content.

For instance, the financial industry uses FpML (Financial products Markup Language), which is an XML meta model providing a message standard for the financial industry, OTC Derivatives. The FpML meta model, version 4.9, groups more than 100 sub requests within 37 XSD files. Another large scale schema is ACORD family of XML specifications for Life, Annuity and Health that enables information exchanges among business partners, and one type in the schema has more than hundreds of sub-types.

There is a need in the art for improved tools for managing access of very large scale schemas and manipulate the data defined by such schemas.

SUMMARY

Provided are a computer program product, system, and method for processing input data in a storage system and in communication with a repository. Views are generated that comprise a tree of nodes selected from a subset of nodes in a hierarchical representation of a schema. The views are saved to the repository. At least one of the views are used to create a job comprising a sequence of data transformation steps to transform the input data described by input schemas to the output data described by output schemas.

BRIEF DESCRIPTION OF THE DRAWINGS

FIG. 16 illustrates an example of an output file produced from execution of a data transformation job.

FIG. 25 illustrates an embodiment of a computing environment.

DETAILED DESCRIPTION

Described embodiments provide techniques to allow a user to utilize views of a large scale schema, where a view is defined as a subset of nodes and trees of nodes in the schema, to compose output, such as an XML file, from a plurality of input sources in a different format, such as text delimited files. Further, the views may be used to parse the input, in a structured format such as XML, to generate a plurality of outputs in a different format, such as text delimited file, database tables, etc.

Figure 1:
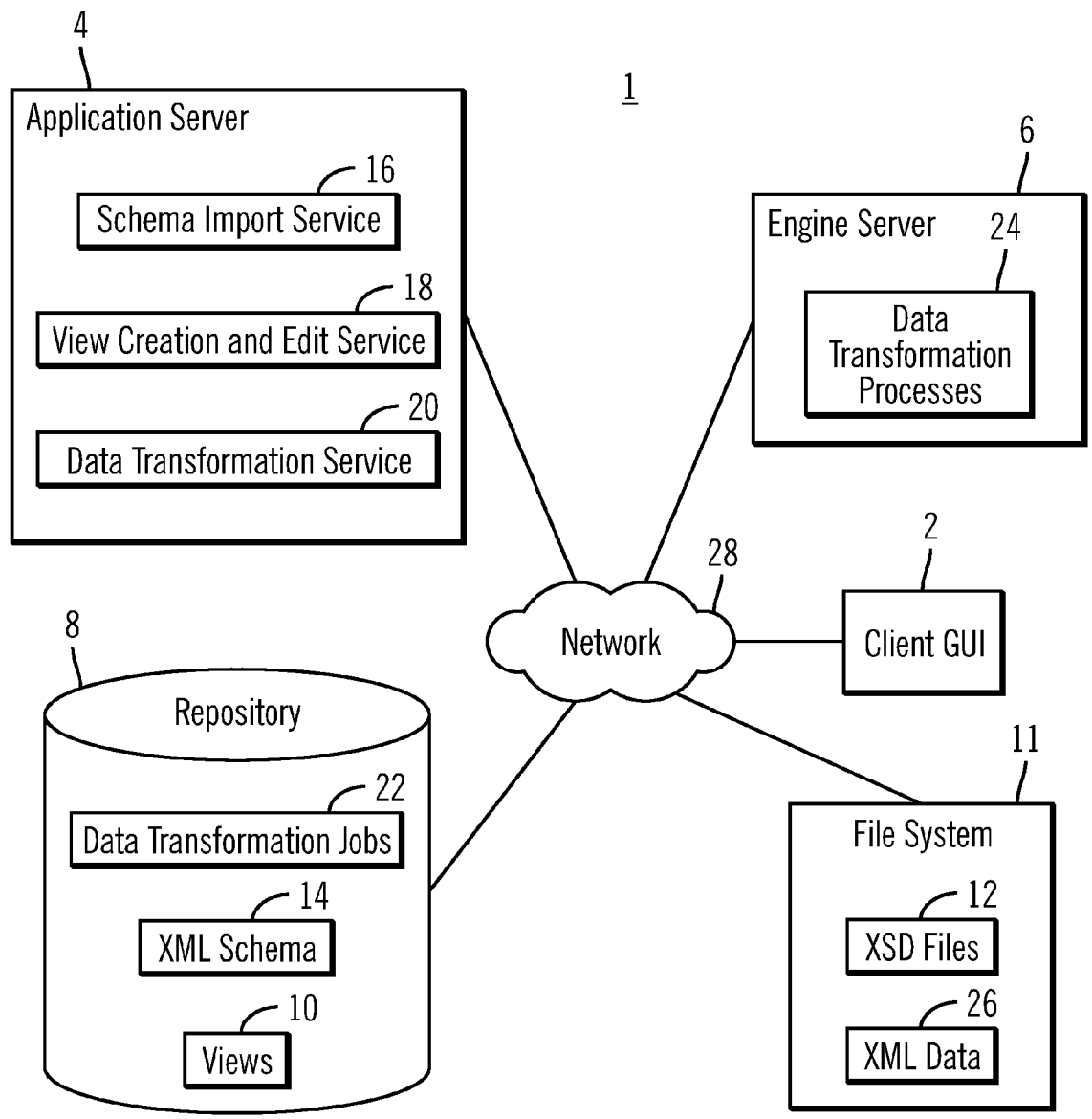
FIG. 1 illustrates an embodiment of a computing environment.

FIG. 1 illustrates an embodiment of a computing environment 1 including a computer with a client web graphical user interface (GUI) 2, an application server 4, an engine server 6, a repository 8, and a file system 11. Users access the client GUI 2 to import XSD files 12 from file system 11 and save the XML schema 14 defined by the XSD files 12 to the repository 8. The client GUI 2 invokes the schema import service 16 deployed on the application server 4 to import XSD files 12 and convert the schema described in the XSD files into multiple trees of nodes. Each tree contains many nodes of various types organized into a hierarchical structure. The client GUI 2 uses the view creation and edit service 18 to create views 10 of an XML schema 14 and save the views 10 to the central repository 8. The client GUI 2 invokes the view creation and edit service 18 deployed on the application server 4 to create and edit views 10.

The client GUI 2 uses the data transformation service 20 to design data transformation jobs 22, which are executed by data transformation processes 24 running in the engine server 6. The data transformation processes 24 executing a data transformation job 22 parse XML data content 26 defined by an XML schema 14 or composes XML data content 26 defined by an XML schema 14. The client GUI 2 utilizes the data transformation service 20 deployed on the application server 4 to create the data transformation jobs 22, which may be stored in the repository 8, and may be accessible to other clients. Views 10 in the repository 8 may be reused in multiple data transformation jobs 22.

The user accesses the client GUI 2 to invoke the data transformation service 20 to retrieve the data transformation jobs 22 from the repository 8 and invoke data transformation processes 24 that execute on the engine server 6 to run the data transformation job 22 to access or create XML data 26 in the file system 6.

The application server 4, engine server 6, client GUI 2, repository 8, and file system 11 may interconnect over a network 28. The components of FIG. 1 may be implemented with suitable computing architectures. In one embodiment, the client GUI 2 may be web based, invoking the services 16, 18, 20, 24, using SOAP (Simple Object Access Protocol) web services or Hypertext Transport Protocol (HTTP) based Representational State Transfer (REST) services. In one embodiment, the client GUI 2 and the services 16, 18, 20, and 24 may be integrated into one standalone application or distributed in multiple application components. The repository 8 may comprise a relational database or a non-relational database. The application server 4 and engine server 6 may be implemented on separate computers or machines or implemented within the same computer and operating system environment.

The repository 8 and file system 11 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The repository 14 and file system 11 may be implemented in the same or different storage devices. The network 28 may comprise an interconnected network (e.g., Intranet, Internet, Local Area Network (LAN), Storage Area Network (SAN), etc.) or comprise direct cable connections between the separate computers implementing the components 4, 6, 2, 8, and 10.

In described embodiments, the schema 14 comprises an XML schema. In alternative embodiments, the schema 14 may be implemented in suitable structured document definition languages other than XML. Further, the XML schema may comprise a text-based meta-language for describing data shared between applications as defined for an industry group. A schema is converted and presented as multiple trees. Each tree contains many nodes of various types organized into a hierarchical structure.

Figure 2:
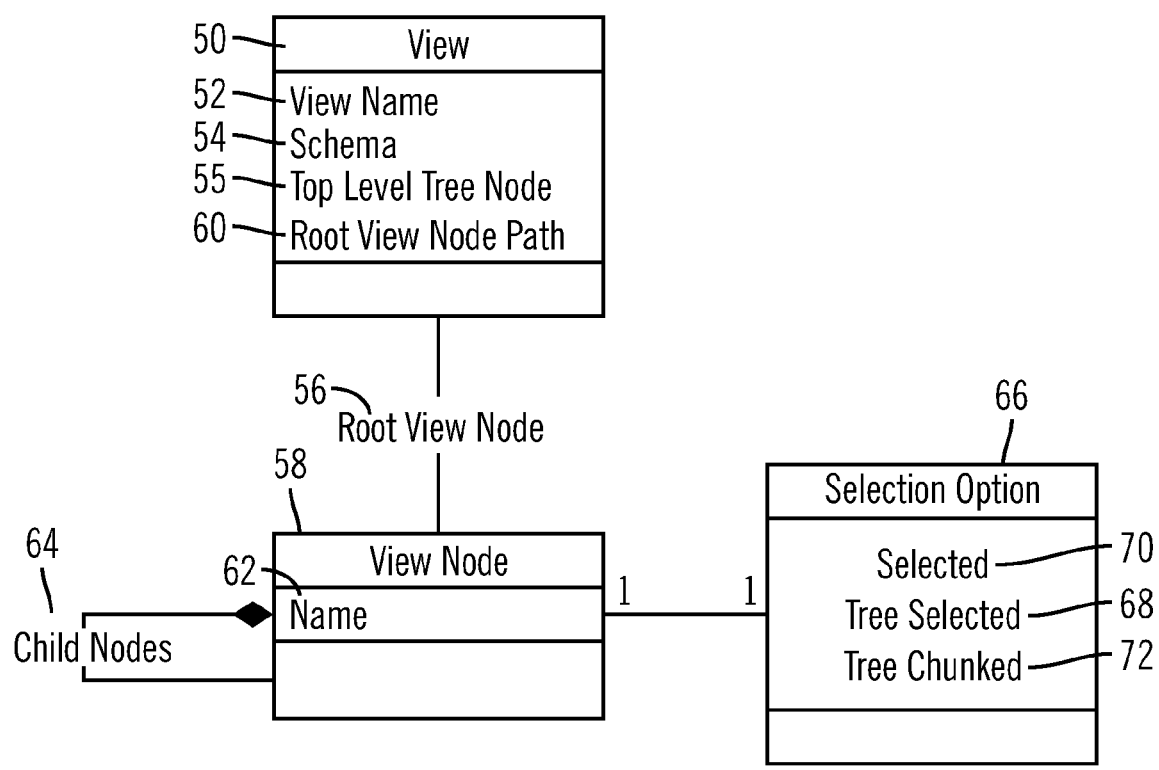
FIG. 2 illustrates an embodiment of a view definition.

FIG. 2 illustrates an embodiment of a view definition 50, providing a definition of one of the views 10, created by the view creation and edit service 18, and stored in the repository 8. The view definition 50 includes a view name 52 or identifier of a view 10; a schema 54 identifying the schema 12 from which the view 52 was generated; a top level tree node 55 identifying the tree in the schema 54 from which the view was generated, a root view node 56 which points to a view node 58 to indicate the node tree for the view 50; and a root view node path 60 indicating the path of the root view node 56 in the tree represented by the tree node 55 in the schema 54 for which the view 50 is generated. Each view node 58 in a view 50 has a matching node in the schema 54. The root view node 56 matches to the node in the schema 54, which can be reached by starting from the root of tree represented by the tree node 55 in the schema 54 and travelling based on the root view node path 60. A view node 58 in a view 50 contains a node name 62 which is the name of the matching node in the schema 54. The view node 58 can have multiple child nodes 64 in the same way as the matching node for the view node 58 can have multiple child nodes in the schema 54. Each child node 64 of the view node 58 is also a view node 58 which can contain its own child nodes.

Each view node 58 may contain a user selection option 66. A tree selected 68 attribute indicates that the node in the schema 54 represented by the view node 58 and all the descendant nodes for the node in the schema 54 presented by the view node 58 are selected in the view 50. A tree selected 68 view node 58 has no child nodes 64 in the view 50. The view creation and edit service 18 and data transformation service 20 automatically deduce from the tree selected 68 attribute that all the descendants of the node in the schema 54 represent by a tree selected view node 58 are selected in the view 50.

The selected 70 attribute indicates that the node in the schema 54 represented by the view node 58 is selected to include in the view 50, and that a subset of the descendants of the node in the schema 54 represented by the view node 58 are included in the view, but not all descendant nodes. The view nodes 58 created for the children will have selection options 66 indicating the status of the child nodes in the view. View nodes 58 would not be created for sub nodes of the root view node 56 that the user deselected or selected to not include in the view. Thus, the view nodes 58 define a view to only include the sub nodes of a root view node indicated as included in the view.

A tree chunked 72 attribute indicates that the node in the schema 54 represented by the view node 58 is selected in the view 50 and the data described by the node tree rooted from the node in the schema 54 represented by the view node 58 is to be processed as a simple XML data chunk. The descendants of the node represented by the view node 58 will not be included the view 50. When the data transformation service 20 processes a view node 58 with the option of tree chunked 72 selected, the data transformation service 20 treats the data chunk in the XML data, described by the node tree rooted from the node in the schema 54 represented by the view node, as a simple string including all the data for the tree from the view node 58 that is chunked. A separate view 50 can be created to model the data for a chunked view node and its related descendants.

Figure 3:
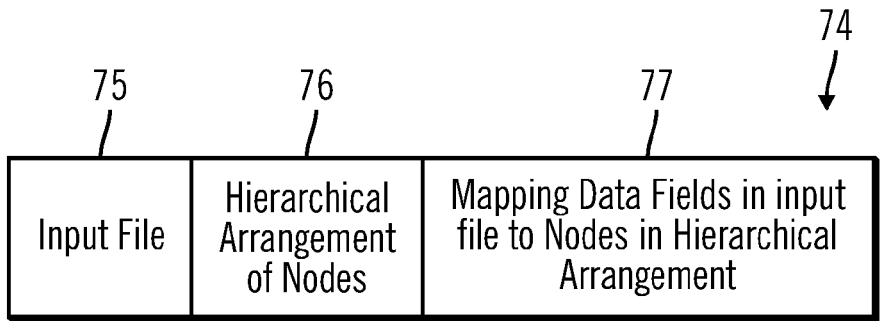
FIG. 3 illustrates an embodiment of a hierarchical representation of an input file.

FIG. 3 illustrates an embodiment of information maintained for a hierarchical representation 74 of an input file 75 comprising a flat text file having text delimited fields of data or a database table having fields. The hierarchical representation 74 includes a hierarchical arrangement of group and content nodes 76 that represents the data fields in the input file 75 and a mapping 77 of the data fields in the input file 75 to nodes in the hierarchical arrangement 76. The hierarchically representation 74 may be generated by the schema import service 16 and the view creation and edit service 18.

Figure 4:
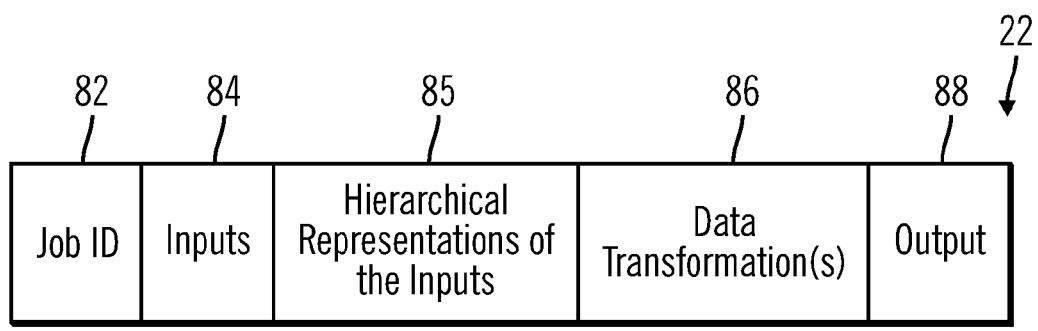
FIG. 4 illustrates an embodiment of a data transformation job.

FIG. 4 illustrates an embodiment of a composer data transformation job 22, comprising one of the data transformation jobs 22 created by the data transformation service 20. A composer data transformation job includes a job identifier (ID) 82 used to identify the job in the repository 8; one or more inputs 84 in a first data format, such as text delimited flat files, database tables; hierarchical representations of the inputs 85, such as instances of the hierarchical representation 74 (FIG. 3); one or more data transformations 86 performed with respect to hierarchical representations 74 of the inputs 82; and an output 88 to which the results of the data transformations 86 are outputted. In one embodiment, the output 88 is in a different data format than that of the inputs, and the output 88 may comprise a structured document in a document markup language, such as an XML document.

Figure 5:
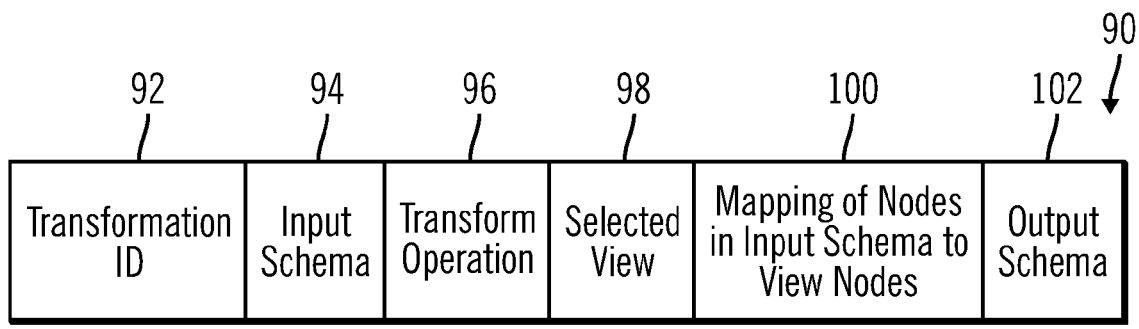
FIG. 5 illustrates an embodiment of a data transformation included in a data transformation job.

FIG. 5 illustrates an embodiment of an instance 90 of one of the indicated composer data transformations 86, including a transformation ID 92; an input schema 94 which describes the input data subject to the transformation; a transform operation 96, which describes the operations to be performed on the input data, composing XML data based on the input data for the composer data transformation; a selected view 98, comprising one of the views 10, to which the results of the transformation will map; a mapping 100 of input schema 94 nodes to the selected view 98 nodes; and an output schema 102, comprising the input schema 94 enhanced by the hierarchical schema nodes describing the composing results by the composer data transformation 86.

Figure 6A:
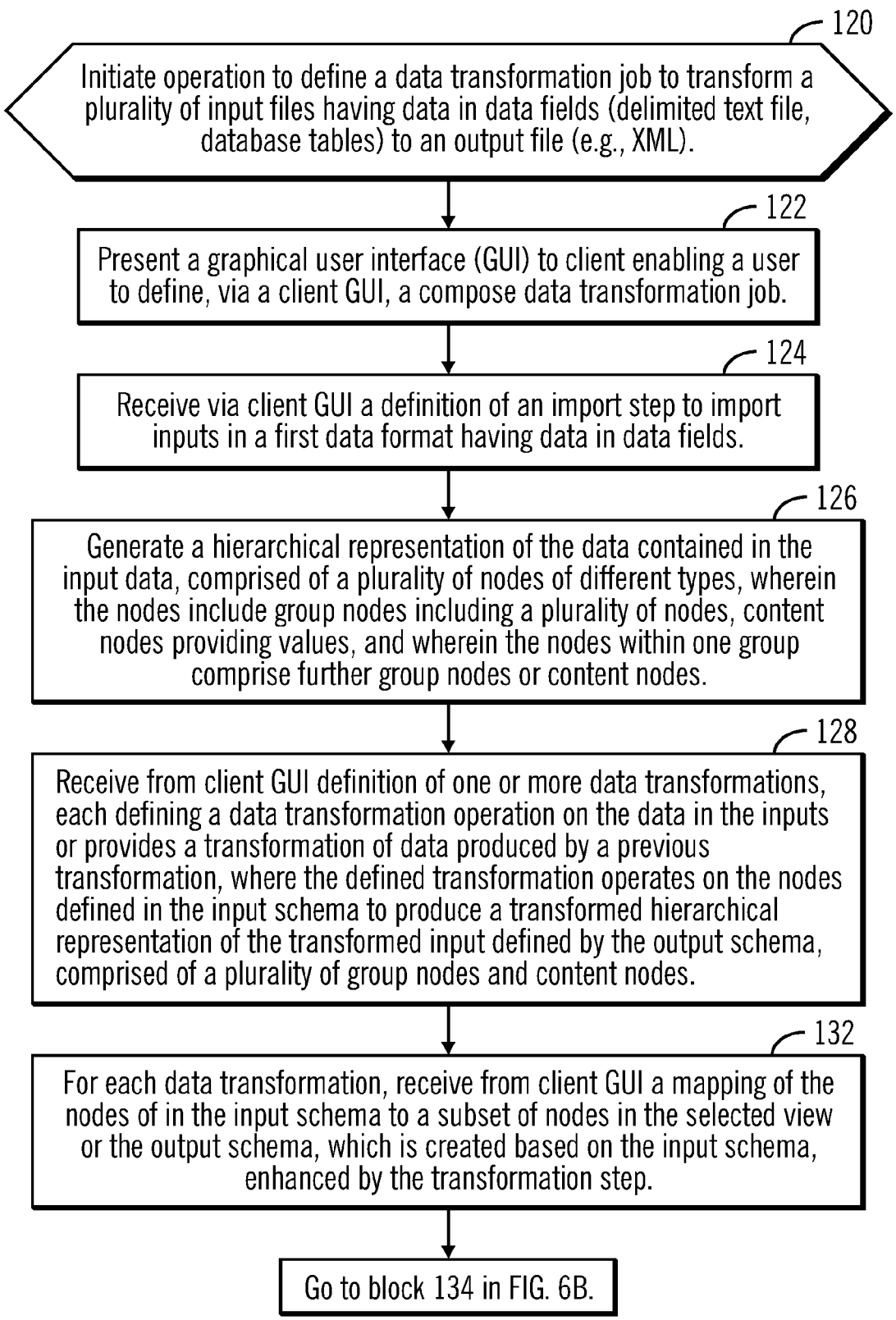
FIGS. 6A and 6B illustrate an embodiment of operations to define a data transformation job.
Figure 6B:
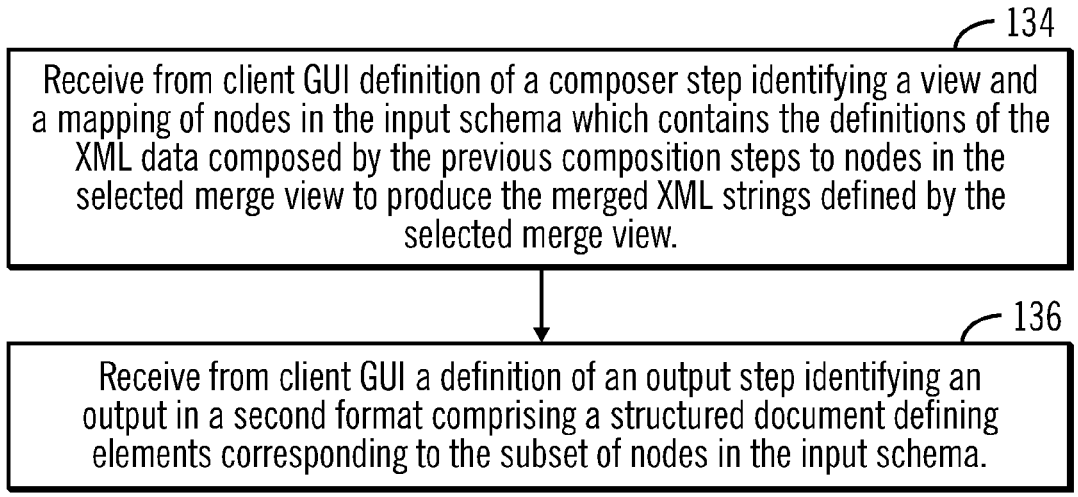

FIGS. 6A and 6B illustrate an embodiment of operations performed by the data transformation service 20 invoked via a client GUI 2 to create or edit a data transformation job 22. Upon the client GUI 2 initiating (at block 120) an operation to create a data transformation job 22 to compose an output (e.g., XML) from one or many inputs having data in data fields (e.g., delimited text file), the data transformation service 20 presents (at block 122) to the client GUI 2 a graphical user interface (GUI) enabling a user to define a compose data transformation job 22. FIGS. 10-15 illustrate an embodiment of the client GUI 2 presented to the user to create the data transformation job 22. The data transformation service 20 receives (at block 124) via the client GUI 2 a definition of an import step to import one or many inputs 84 (FIG. 4) in a first data format having data in data fields, such as a text delimited file. For each of the imported inputs 84, the data transformation services 20 generates (at block 126) a hierarchical representation 74 of the data in the imported inputs comprised of a plurality of nodes of different types. The nodes of the hierarchical representation 74 include group nodes including a plurality of nodes, content nodes providing values. The nodes within one group comprise further group nodes or content nodes. The hierarchical representation 74 of the imported inputs of the import step will become the output schema 102 of the import step.

The data transformation services 20 receives (at block 128), via the client GUI 2, a definition of one or more data transformations 90, identified in field 86. Each received data transformation 90 defines a data transformation operation 96 on the data in the inputs. Alternatively, the data transformation 96 may define a transformation of data produced by a previous transformation. The defined transformation 96 operates on the nodes defined in the input schema 94 to produce a transformed hierarchical representation of the transformed input defined by the output schema 102, comprised of a plurality of group nodes and content nodes. The mapping 100 maps the nodes in the input schema 94 to the subset of nodes in the selected view 98 or the output schema 102, which is created based on the input schema 94, enhanced by the transformation. For example, in the composer transformation, the output schema 102 is created based on the input schema 94 and enhanced by the schema nodes describing the composing result produced by the composer transformation. The composing result is produced by mapping the input data described in the input schema 94 to an XML data chunk described by a selected view 98. In one embodiment, the data transformation 96 may comprise a JOIN operation to join two lists of input data defined in the input schema 94. The data transformation service 20 further receives (at block 132), for each data transformation 90, a mapping 100 of the nodes of in the input schema 94 to a subset of nodes in the selected view or the output schema 102, which is created based on the input schema, enhanced by the transformation The data transformation service 20 may further receive (at block 134 in FIG. 6B) from the client GUI 2 a composer step identifying a view and a mapping of nodes in the input schema 94, which contains the definitions of the XML data composed by the previous transformation steps, to nodes in the selected merge view. For instance, a composer transformation may indicate a composition transform operation 96, identify a selected view 98 and identify a mapping 102 of nodes resulting from previous data transformation operations to the selected view 98 node. The data transformation service 20 may receive (at block 136) from the client GUI 2 a definition of an output step identifying an output second format comprising a structured document defining elements corresponding to the subset of nodes in the input schema 94. The above definitions provided by the client GUI 2 according to the operations of FIGS. 6A and 6B are maintained in the composer data transformation job 22. The data transformation jobs 22 may be saved in the repository 8 for later retrieval and execution and modification.

Figure 7:
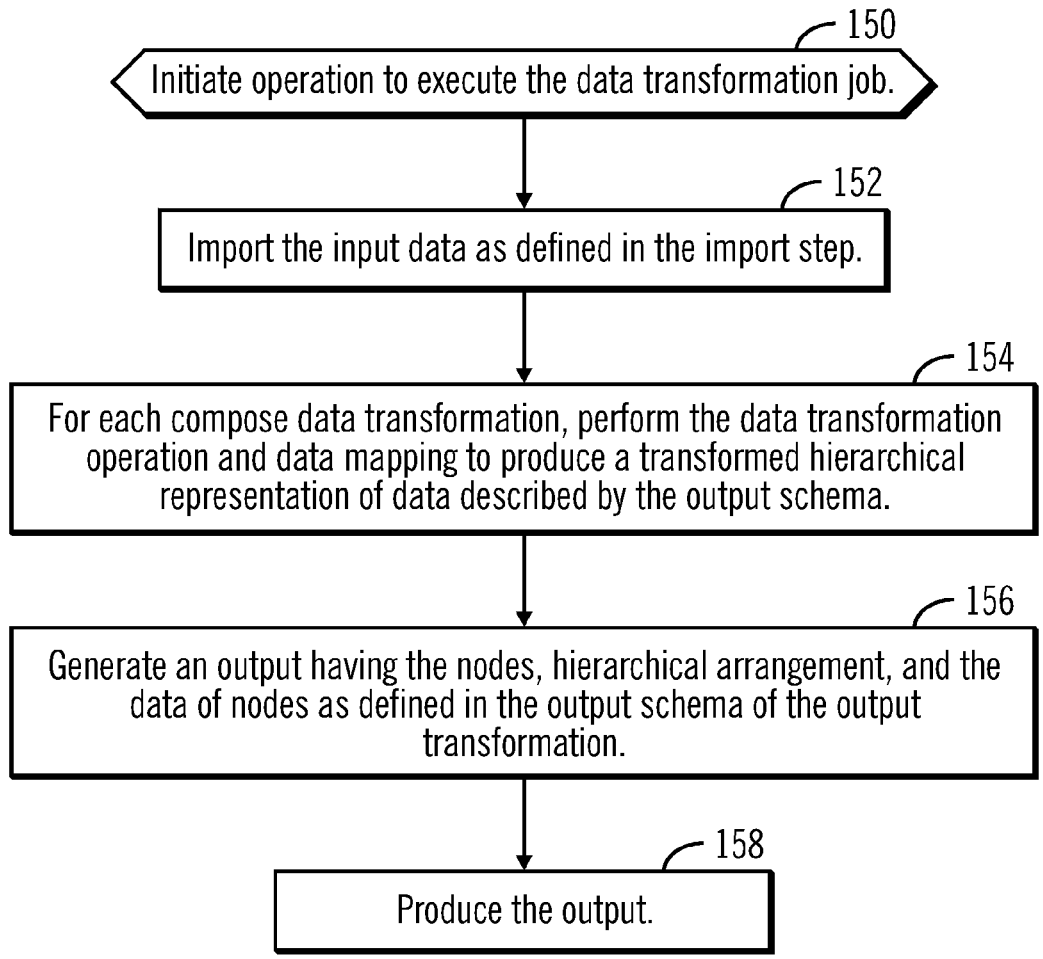
FIG. 7 illustrates an embodiment of operations to execute a data transformation job.

FIG. 7 illustrates an embodiment of operations performed by a data transformation process 24 invoked by a user at the client GUI 2 to execute a data transformation job 22 in the repository 8. Upon initiating (at block 150) the operation to execute a selected data transformation job 22, the data transformation process 22 imports the input 84 data as defined during the import step (at block 152). For each data transformation 86 for the job 90, the data transformation process 24 performs (at block 154) the data transformation operation and data mapping to produce a transformed hierarchical representation of data described by the output schema 102. For the last composing operation, the data transformation process 24 uses (at block 156) the merge mapping 100 to map the data from the nodes resulting from the previous composing data transformations and other transformations to nodes in the merge view. Outputs 88 having the nodes, hierarchical arrangement, and data of nodes as defined by the output schema 102 are generated (at block 156) as defined in the output schema 102 and the output is produced (at block 158). In one embodiment, the inputs 84 for the data transformations may comprise text delimited flat files and the output may comprise a structured document having markup language tags structuring the data, such as an XML file.

Figures 8, 9:
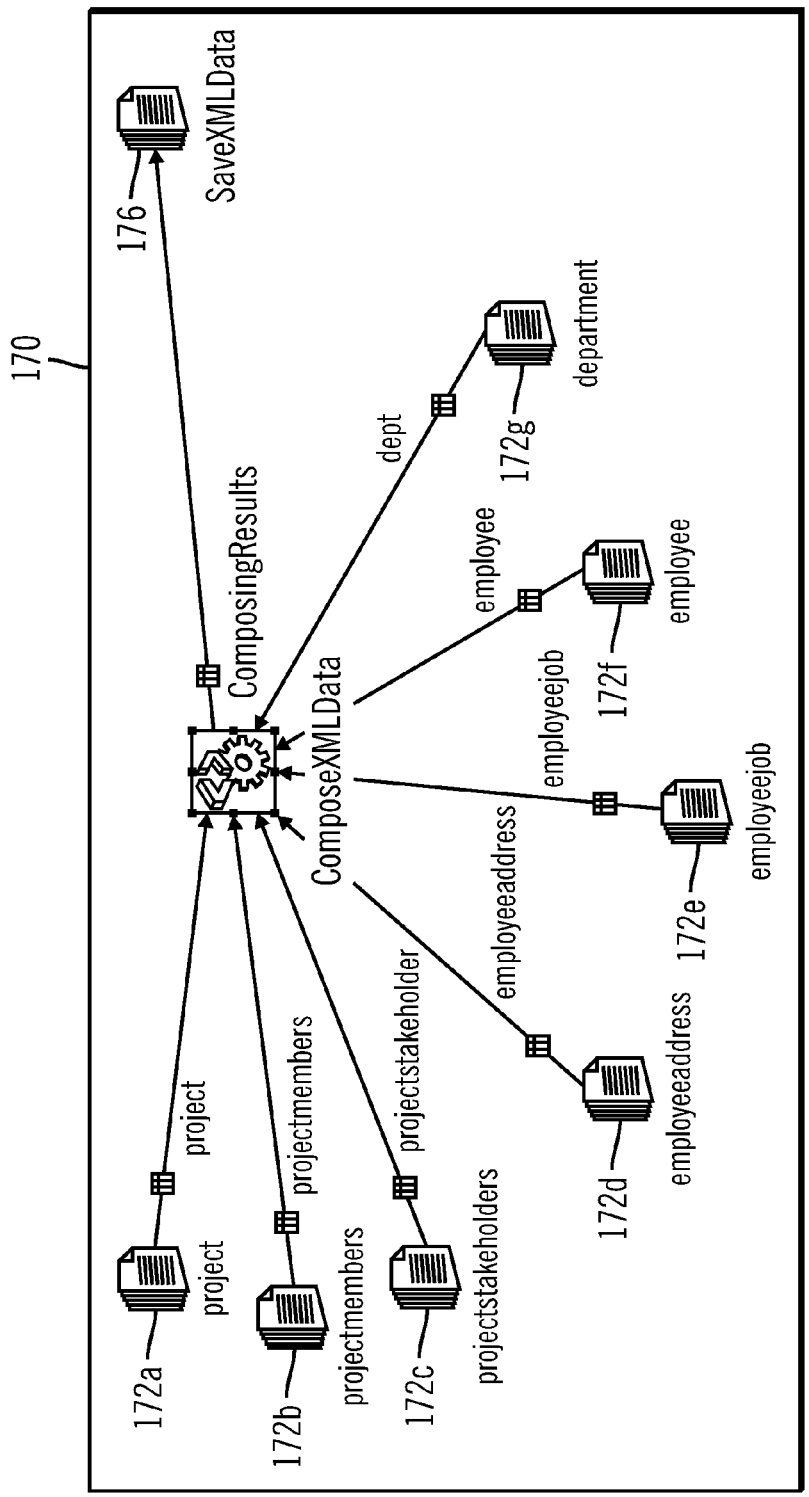
FIG. 8 illustrates a representation of a data transformation job.
FIG. 9 illustrates an embodiment of an input file.

FIG. 8 illustrates an example of a representation of data transformation job 170 having a plurality of input files 172a through 172g, which are sent to a data transformation job 174 to produce composing results that result in an XML document 176.

FIG. 9 illustrates an example of one of the inputs 84, comprising a text file, which is supplied to a data transformation job 22, which comprises a text delimited file having employee information.

Figure 10:
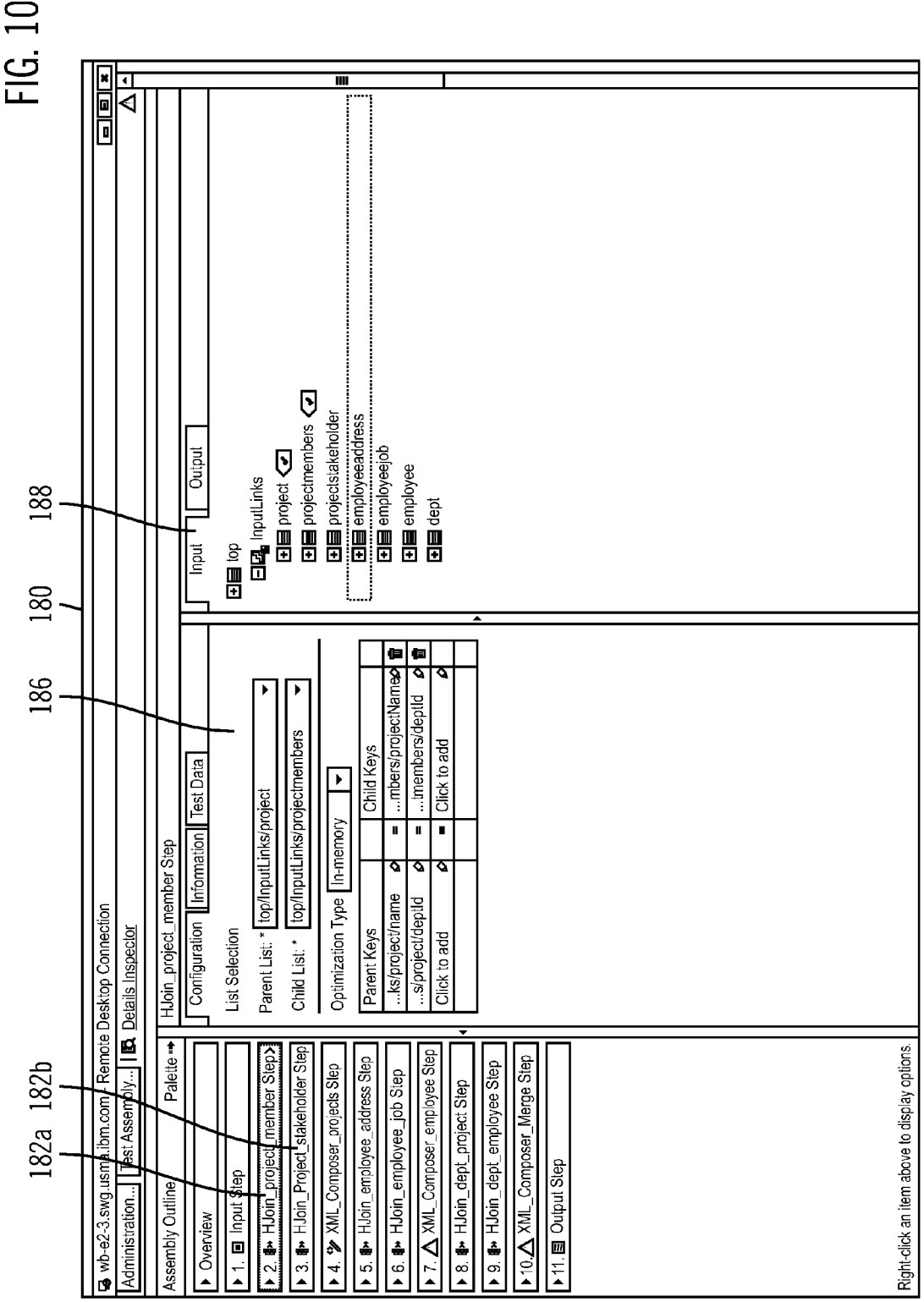
FIGS. 10-15 illustrate an embodiment of graphical user interfaces (GUIs) used to define a data transformation job.

FIG. 10 illustrates an embodiment of a GUI 180 in which the user at the client GUI 2 may use to define a data transformation job 22. The two data transformation operations have two joins 182a and 182b, each join operation joins two selected list nodes based on the selected keys in the input schema. For instance, the JOIN 182a provides a JOIN of the project 172a and project members 172b input files (FIG. 8), as shown in the List Selection 186 and Input 188 sections of the GUI 180.

Figure 11:
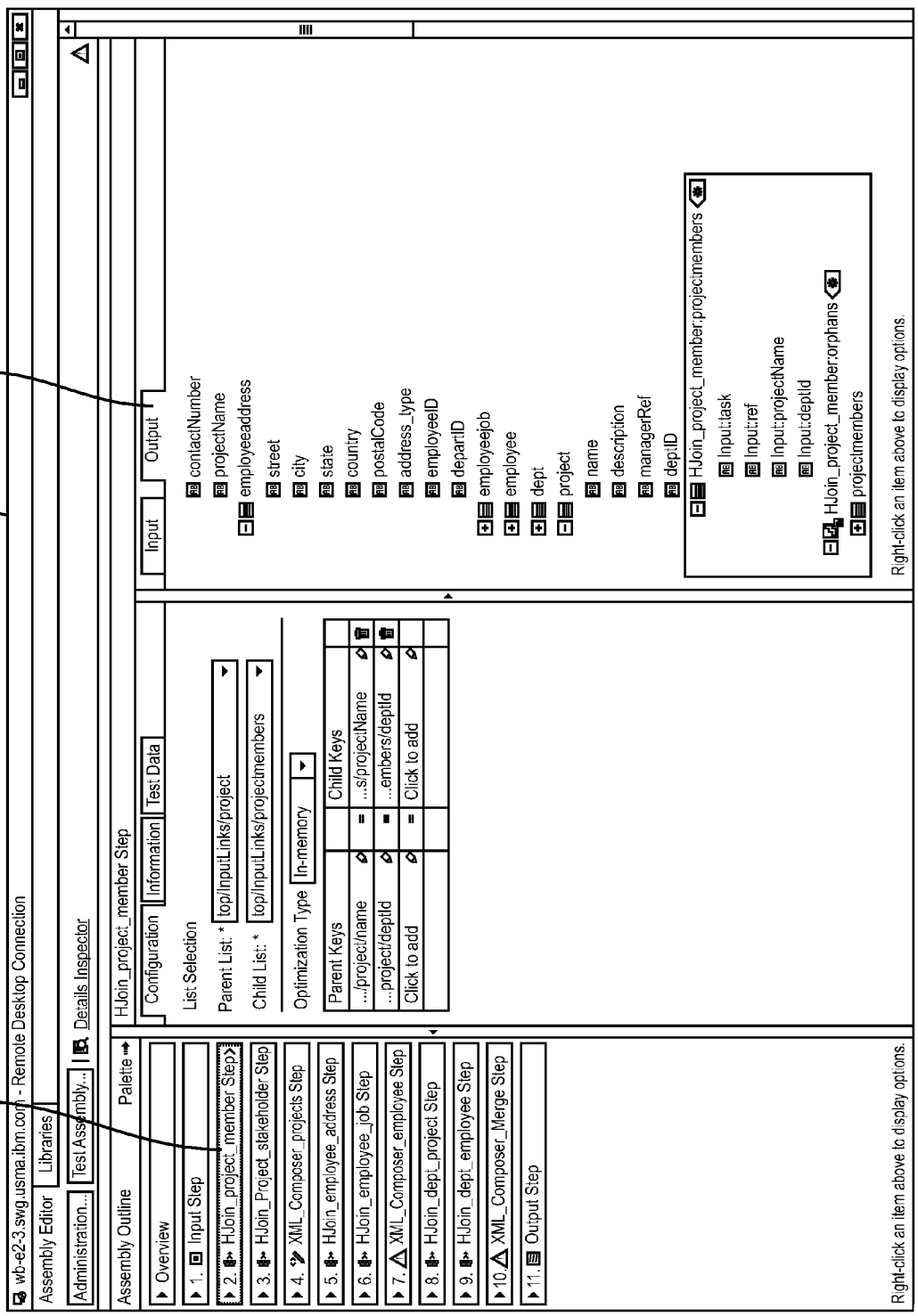

FIG. 11 illustrates the GUI 180 showing the output 190 hierarchical representation of nodes representing the input files project and project members subject to the JOIN 182a.

Figure 12:
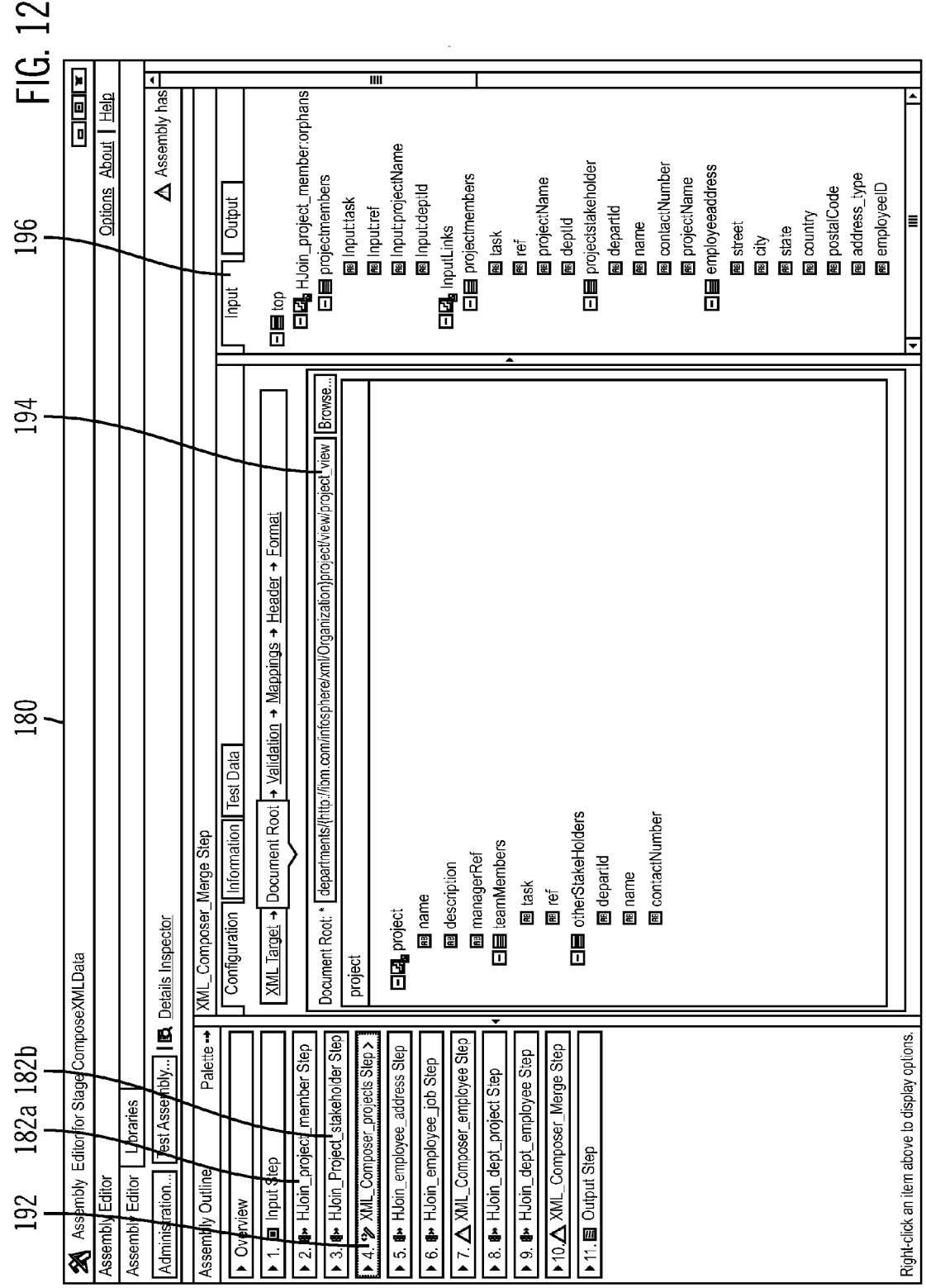

FIG. 12 illustrates the GUI 180 showing the user selecting a composer step 192 to define a composer data transformation that maps the results of the JOINs 182a, 182b to compose XML data defined by a selected view 98. The input panel 196 shows a hierarchical representation of the results of the JOINS 182a, 182b subject to the mapping to the view.

Figure 13:
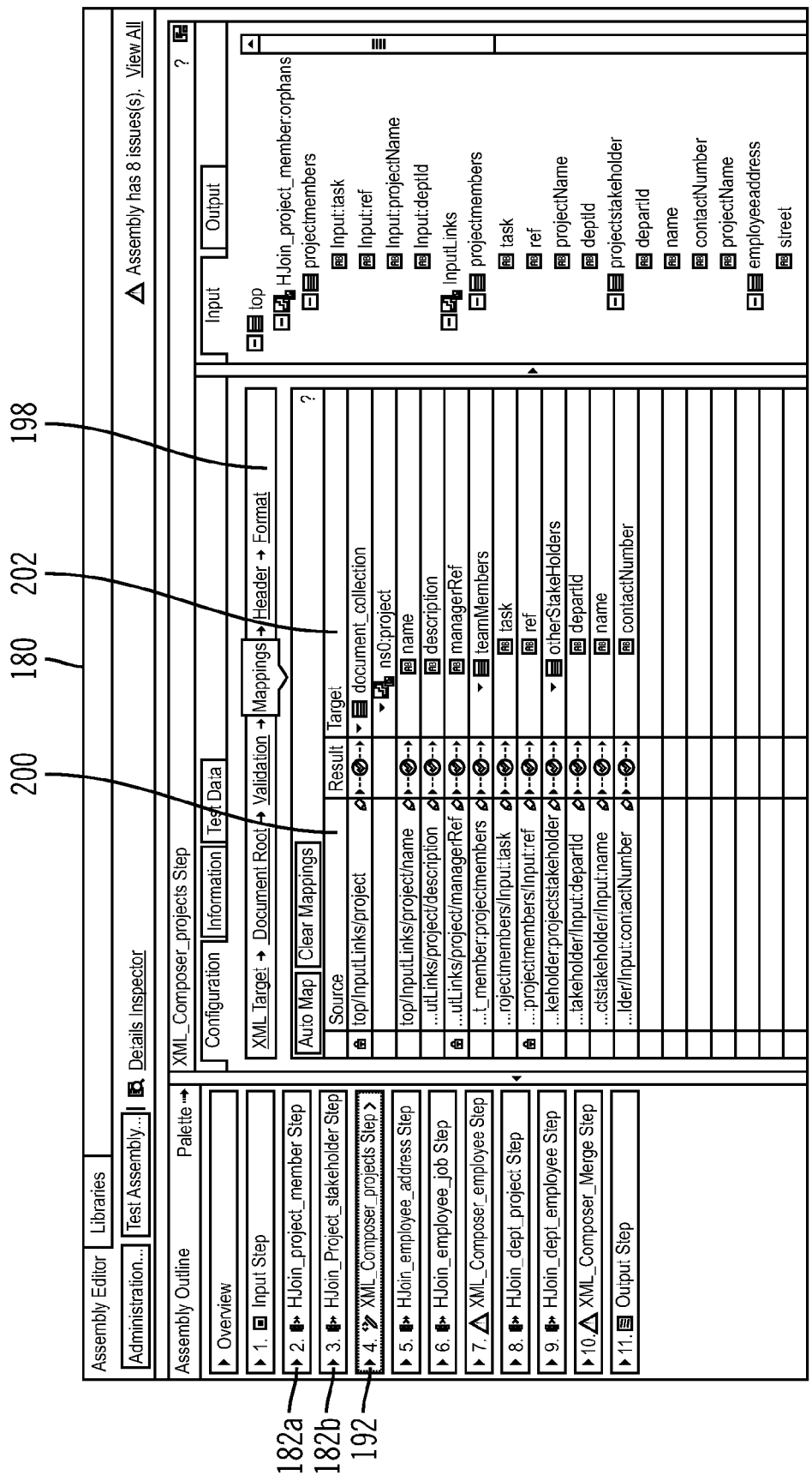

FIG. 13 illustrates the GUI 180 enabling the user to define the composer data transformation 192 to create the mapping 102 (FIG. 5) in panel 198 of the results of the of the JOINs 182a, 182b to the nodes of the selected view. The source column 200 provides the nodes described by the input schema 94 which contains the description of the results of the join operations 182a, 182b. The target column 202 provides the nodes of a selected view 194 to which the nodes in the source column 200 map.

Figure 14:
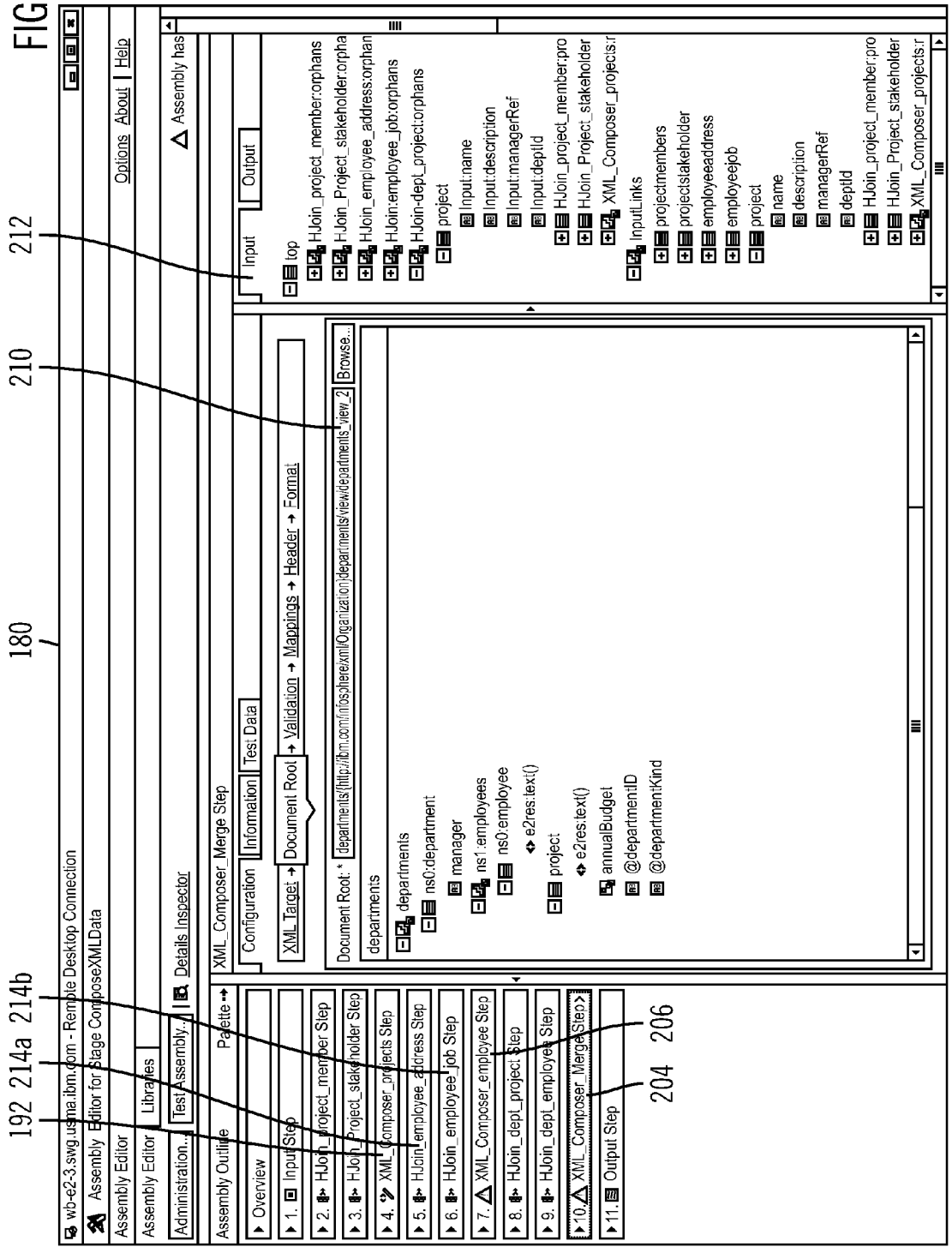

FIG. 14 illustrates the GUI 180 being used to define a composing transformation 204 to map the results of the JOIN data transformations 214a and 214b, the results from composer data transformations 192 and 206, shown in the input panel 212 to a selected merge view 210.

Figure 15:
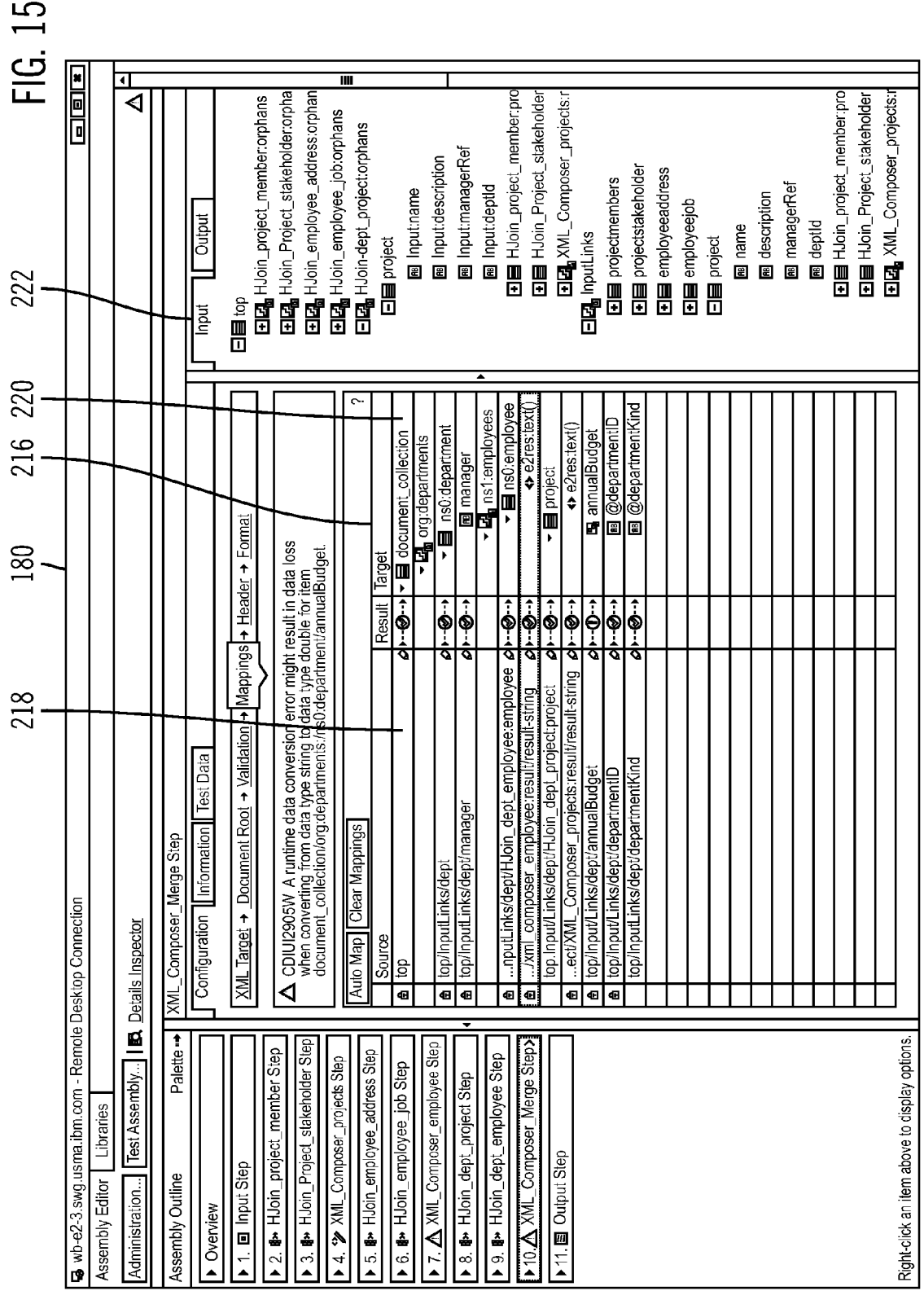

FIG. 15 illustrates the GUI 180 being used to provide a mapping 216 to map the nodes described by the input schema 94, shown in the source column 218 to nodes of a selected view 220 shown in the target column 220. The input panel 222 shows the nodes in the input schema 94, resulting from the previous transformations.

FIG. 16 illustrates an embodiment of the output 88 comprising an XML document resulting from all the transformations 86 in the executed data transformation job 22 (FIG. 4).

Figure 17:
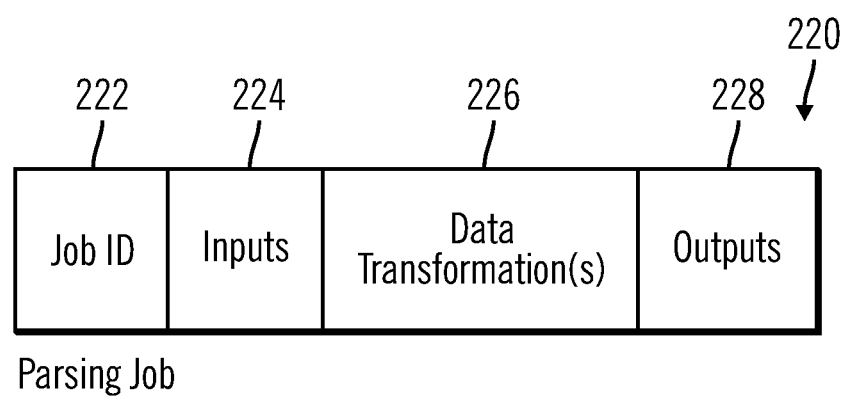
FIG. 17 illustrates an embodiment of a parsing job.

FIG. 17 illustrates a transformation job 22 comprising a parsing job 220, which includes a job identifier (ID) 222 used to identify the job in the repository 8; one input 224, such as an XML file; data transformations 226 indicating multiple parsing operations on the nodes of the input 224 to parse XML strings and an output transformation to map to outputs 228; and outputs 228 such as text delimited flat files, database tables, etc.

Figure 18:
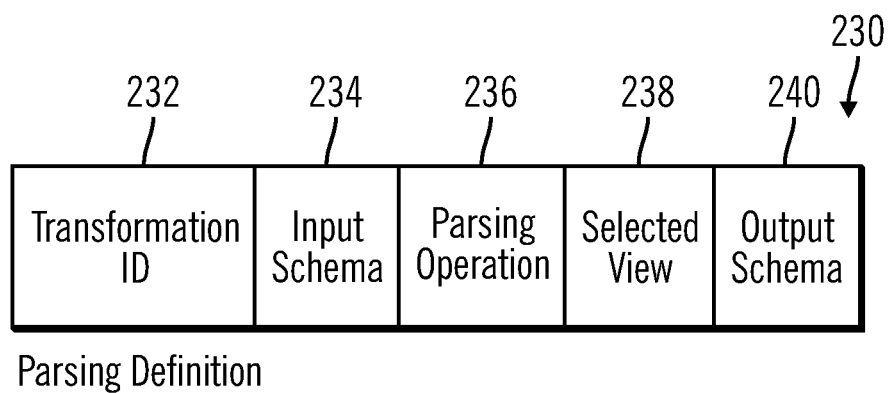
FIG. 18 illustrates an embodiment of a parsing definition included in a parsing job.

FIG. 18 illustrates an embodiment of a parsing definition 230, such as one of the data transformation definitions 226, including a transformation ID 232; the input schema 234 which describes the input data which contains the XML data for parsing; a parsing operation 236 describing the parsing operation to be performed, including the node in the input schema 234 which contains the XML string to be parsed and the validations that the parsing operation needs to perform and the error handling mechanisms that defines what the parsing operation needs to follow if the XML data is invalid; and the selected view 238 to generate the hierarchical arrangement of a group of nodes based on the XML string; and the output schema 240, comprising the input schema 234 enhanced by the hierarchical schema described by the selected view 238.

Figure 19:
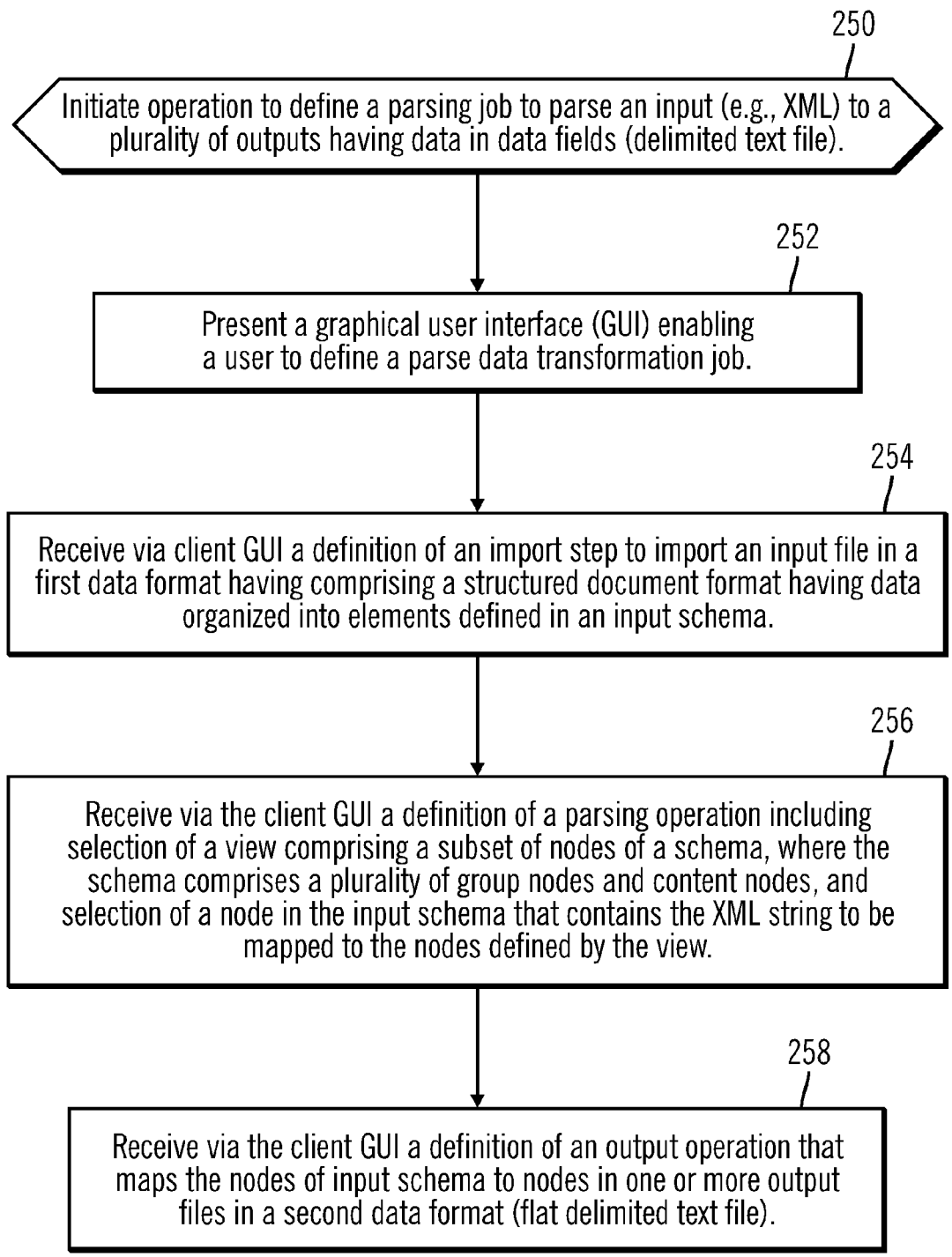
FIG. 19 illustrates an embodiment of operations to define a parsing job to parse an input file to a plurality of output files.

FIG. 19 illustrates an embodiment of operations performed by the data transformation service 20 to create a parsing job 22 to parse an input file in one data format, such as XML to a plurality of output files in a different data format, such as text delimited flat file, database table, etc. Upon initiating (at block 250) an operation to define a parsing job 220 to parse an input file (e.g., XML) to a plurality of output files having data in data fields (delimited text file, database table), the data transformation service 20 presents (at block 252) a GUI to the client GUI 2 enabling a user to define a parsing job 220. The data transformation service 20 receives (at block 254) via the client GUI 2 a definition of an import step of an input file 222 (e.g., XML). The data transformation service 20 further receives (at block 256) via a the client GUI 2 a definition of a definitions of multiple parsing operations 226. Each parsing operation definition 230 may include the selection of a view 238 comprising a subset of nodes of a schema comprising a plurality of group nodes and content nodes, the selection of a node in the input schema 234 that contains the XML string to be mapped to the nodes defined by the view 238, the XML parsing validation rules, and error handling mechanisms performed when the XML data is invalid The data transformation service 20 further receives (at block 258) vi the client GUI 2 a definition of an output operation that maps the nodes of input schema to nodes in one or more output files in a second data format (flat delimited text file). The input schema for the output operation is created from the output schema of the last parsing operation.

Figure 20:
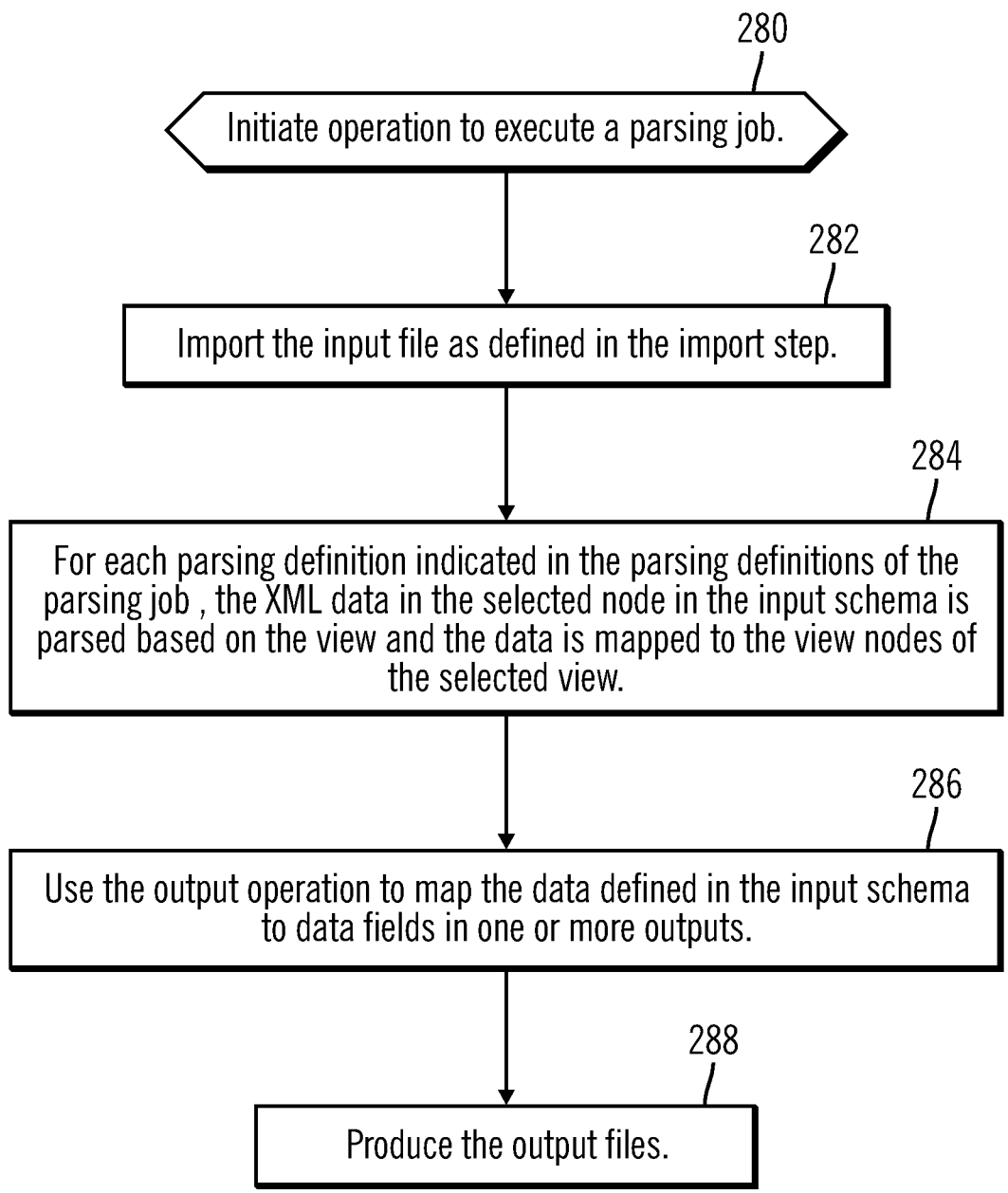
FIG. 20 illustrates an embodiment of operations to execute a parsing job.

FIG. 20 illustrates an embodiment of operations performed by a data transformation process 24 to execute a parsing job 220. Upon initiating (at block 280) the operation to execute a parse job 22 in the engine server 6, the data transformation process 24 imports (at block 282) the input 222, e.g., XML file. For each parsing definition 230 indicated in the parsing definitions 226 of the parsing job 220, the XML data in the selected node in the input schema 234 is parsed (at block 284) based on the view 238 and the data is mapped to the view nodes of the selected view 234. The data transformation process 24 further uses (at block 286) the output operation to map the data defined in the input schema 234 to data fields in one or more outputs, such as text delimited fields, database table fields, etc. The input schema 94 for the output operation 96 is created from the output schema 102 of the last parsing operation. The input schema of the output operations describes the parsing results of multiple parsing operations. The generated outputs 288 are then produced (at block 288).

Figure 21:
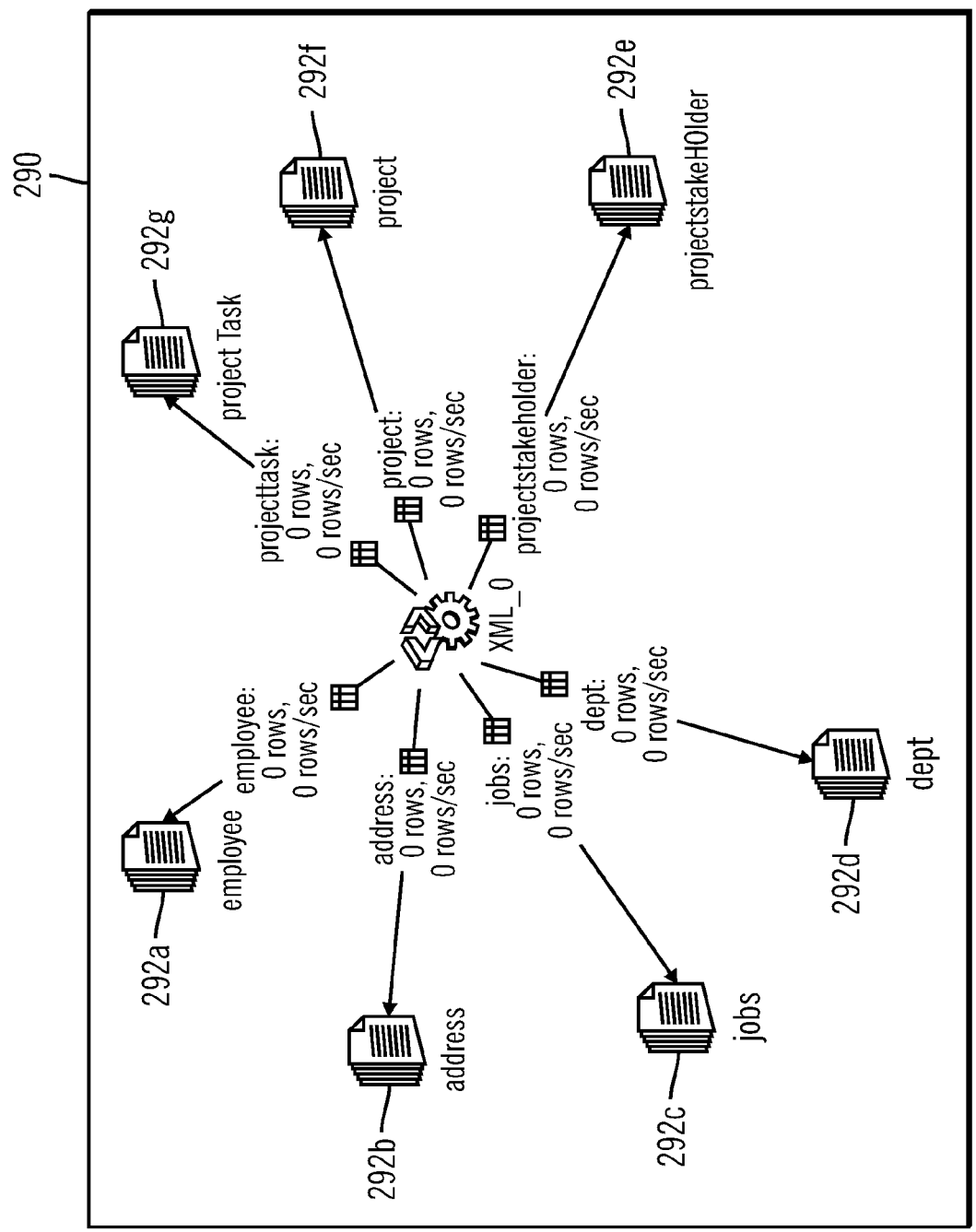
FIG. 21 illustrates a representation of a parsing job.

FIG. 21 illustrates a representation 290 of how a parser job maps an XML file having various nodes to different output files 292a, 292b . . . 292g having data generated by parsing the input XML file 222.

Figure 22:
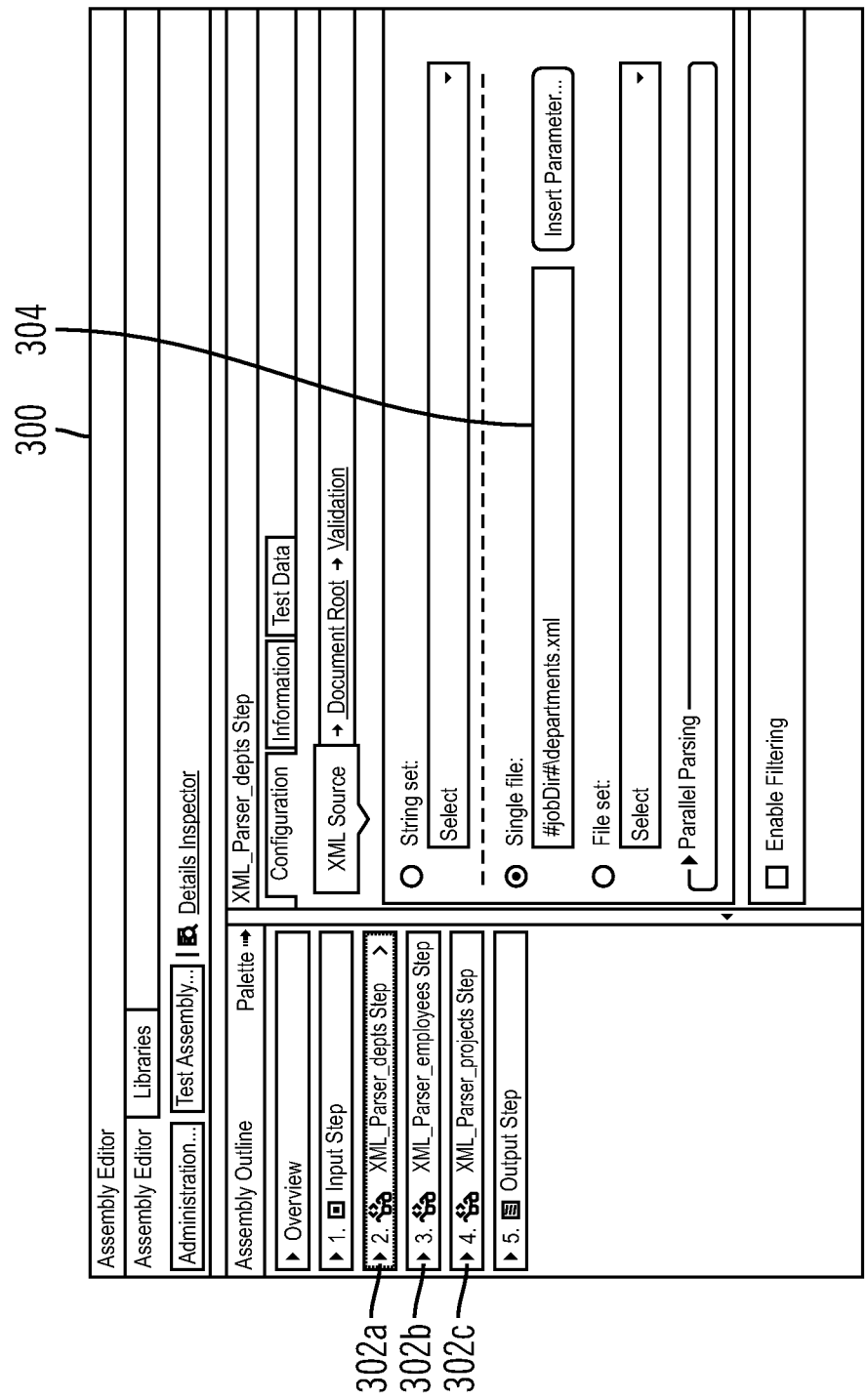
FIGS. 22-24 illustrate an embodiment of graphical user interfaces (GUIs) used to define a parsing job.

FIG. 22 illustrates an embodiment of a GUI 300 in which multiple parser definitions 302a, 302b, 302c are defined for parsing the input (deparments.xml) selected in the field 304 as the XML source.

Figure 23:
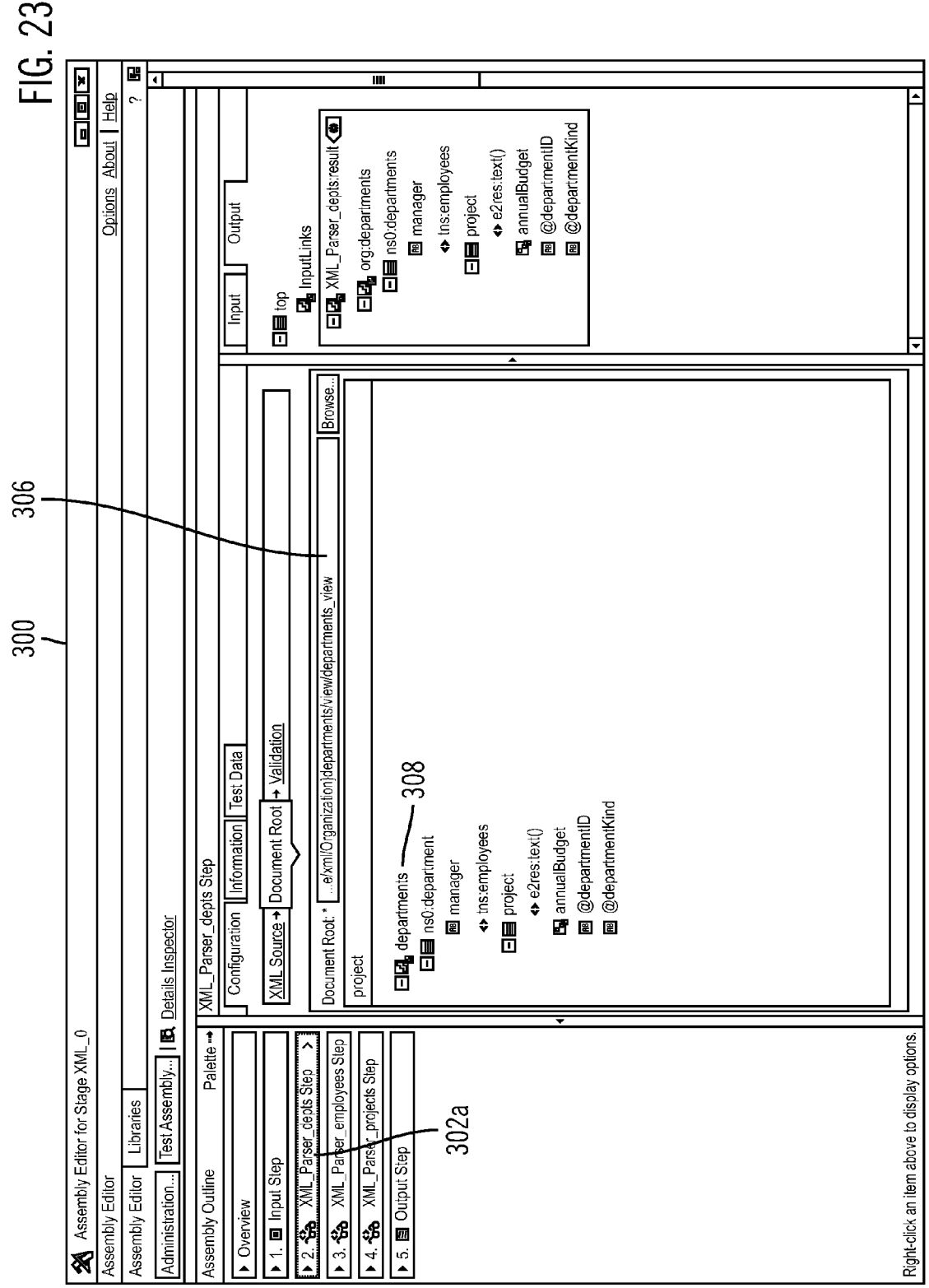

FIG. 23 illustrates an embodiment of the GUI 300 where the user has defined a view 234 in the field 306 for the parsing definition 302a. The selected view 306 is shown in panel 308.

Figure 24:
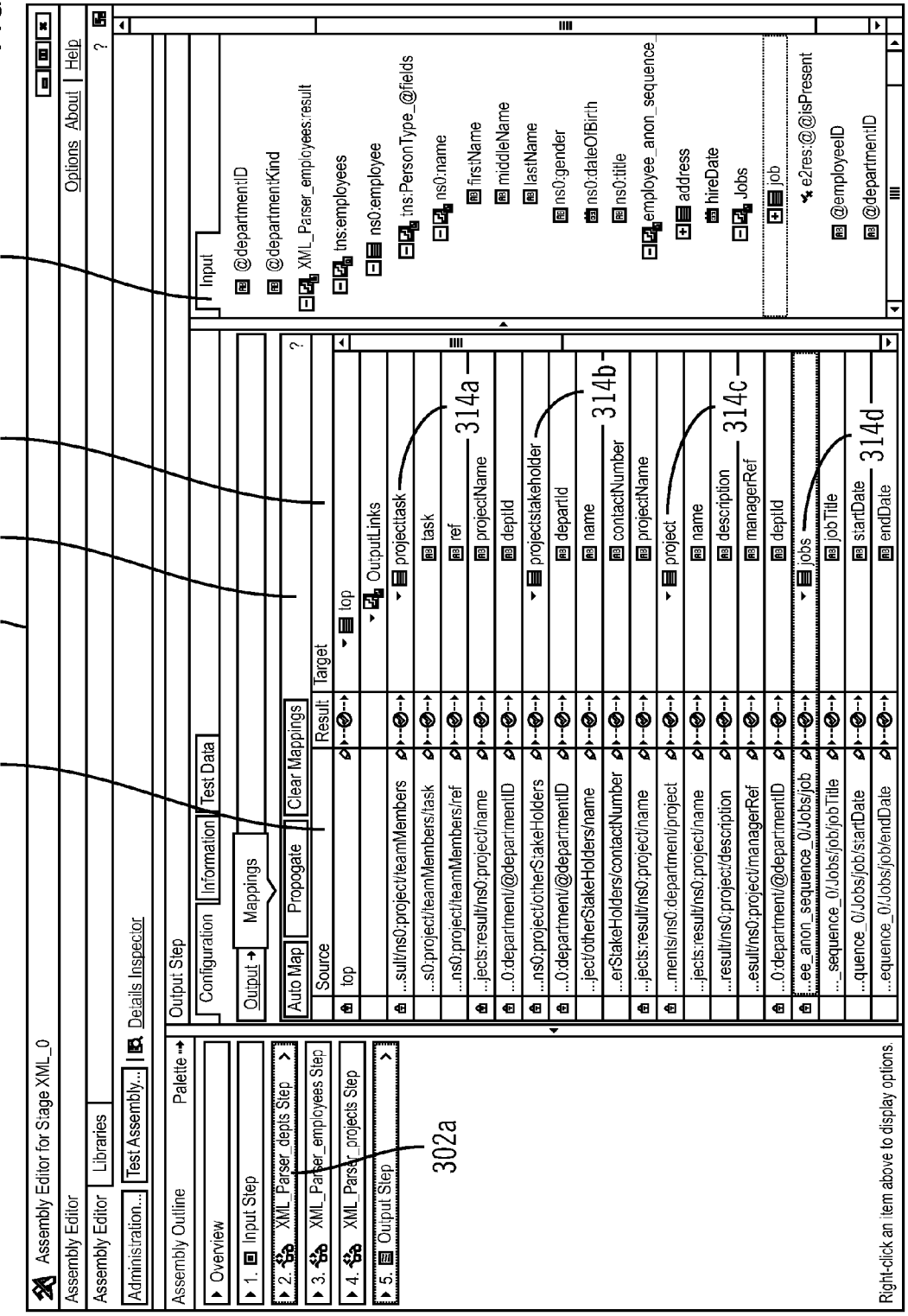

FIG. 24 illustrates an embodiment of the GUI 300 providing a mapping panel 308 in which the user may specify the mapping of the parsing results from three parsing operations which are described by the input schema 234 of the output operation to the fields of the output files 292a, 292b . . . 292g being generated. A source column 310 shows the nodes from the intermediary hierarchical arrangements of nodes resulting form the separate parsing definitions and a target column 312 shows the fields of different output files 314a, 314b, 314c, 314d to which the source nodes in the source column 310 map. An input panel 316 shows the hierarchical arrangement of all the nodes in the input schema 234 in the output operation which describes all the parsing results from three parsing operations.

The described embodiments provide techniques to create data transformation jobs that transform data in one or many inputs in first data formats to one or many outputs in a different data formats from the inputs by defining a plurality of data transformations that transform and map data described by the input schemas to nodes described by the selected views and output schemas. Further, a parsing or composing data transformation use a view to parse or compose XML data chunks where a view comprising a subset of nodes from a schema describes the XML data chunks.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The elements of the computing environment of FIG. 1, including the application server 4 and components 16, 18, 20, engine server 6 and component 24, repository 8, and file system 11 may be implemented in one or more computer systems, such as the computer system 402 shown in FIG. 25. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 25, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computing environment 1 may be implemented as program modules 416 which generally carry out the functions and/or methodologies of embodiments of the invention as described herein. The components 18, 24, 28, 48, and 50 of the computing environment 1 may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 12; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing input data in a storage system and in communication with a repository, wherein the computer program product comprises a non-transitory computer readable storage medium having computer readable program code embodied therein that executes to perform operations, the operations comprising:
generating views, each view comprising a tree of nodes selected from a subset of nodes in a hierarchical representation of a schema;
saving the views to the repository; and
using a selected view comprising at least one of the views to create a job comprising a sequence of data transformation steps to transform input data described by an input schema in a first data format to output data described by an output schema in a second data format, wherein the sequence of data transformation steps include operations on nodes of data from the input data that map results of the sequence of data transformation steps to the selected view, wherein the first data format has text delimited data or a database file and wherein the second data format defines a hierarchical representation of nodes that represent data and a relationship of data content.

2. The computer program product of claim 1, wherein creating the job comprises:
receiving a mapping of the nodes in the input schema to nodes in the selected view; and
using the mapping to map the input data in the first data format into the nodes of the selected view, wherein the nodes of the selected view are mapped to output data in the second data format comprising a structured document defining elements corresponding to the subset of nodes in the selected view.

3. The computer program product of claim 1, wherein the views can be reused in multiple data transformation jobs.

4. The computer program product of claim 1, wherein the selected view is used to parse the input data and generate a hierarchical representation of the data described by the selected view.

5. The computer program product of claim 1, wherein the data transformation steps comprise composing steps using different views from the input schema.

6. The computer program product of claim 5, wherein the data transformation steps include join operations on the nodes of the input data to map the results of the join operations to the selected view, and wherein the composing steps perform merging of the results of the join operations mapped to the selected view and maps the results to the selected view.

7. The computer program product of claim 1, wherein the selected view used in the job includes a chunked node, wherein the sequence of data transformation steps comprises including all data and nodes in a tree of nodes from the chunked node into a string stored at the chunk node, and wherein the chunked node and the string map to one of the nodes in the output data.

8. The computer program product of claim 1, wherein the operations further comprise:
generating a graphical user interface to enable a user to select inputs, views, and output data to define the job.

9. A system for processing input data in a storage system and in communication with a repository, comprising:
a processor including a hardware component;
a computer readable storage medium having computer readable program code embodied therein executed by the processor to perform operations, the operations comprising:
generating views, each view comprising a tree of nodes selected from a subset of nodes in a hierarchical representation of a schema;
saving the views to the repository; and
using a selected view comprising at least one of the views to create a job comprising a sequence of data transformation steps to transform input data described by an input schema in a first data format to output data described by an output schema in a second data format, wherein the sequence of data transformation steps include operations on the nodes of the input data that map results of the sequence of the data transformation steps to the selected view, wherein the first data format has text delimited data or a database file and wherein the second data format defines a hierarchical representation of the nodes that represent data and a relationship of data content.

10. The system of claim 9, wherein creating the job comprises:
receiving a mapping of the nodes in the input schema to nodes in the selected view; and
using the mapping to map the data from the input data in the first data format into the nodes of the selected view, wherein the nodes of the selected view are mapped to output data in the second data format comprising a structured document defining elements corresponding to the subset of nodes in the selected view.

11. The system of claim 9, wherein the selected view is used to parse the input data and generate a hierarchical representation of the data described by the selected view.

12. The system of claim 9, wherein the sequence of data transformation steps comprise composing steps using different views from the input schema.

13. The system of claim 12, wherein the sequence of data transformation steps include join operations on the nodes of data from the input data to map results of the join operations to the selected view, and wherein the composing steps perform merging of the results of the join operations mapped to the selected view and maps the results to the selected view.

14. The system of claim 9, wherein the selected view used in the job includes a chunked node, wherein the sequence of data transformation steps comprises including all data and nodes in a tree of nodes from the chunked node into a string stored at the chunk node, and wherein the chunked node and the string map to one of the nodes in the output data.

15. A method for processing input data with a processor in a storage system, comprising:
generating views, each view comprising a tree of nodes selected from a subset of nodes in a hierarchical representation of a schema;
saving the views to a repository; and
using a selected view comprising at least one of the views to create a job comprising a sequence of data transformation steps to transform input data described by an input schema in a first data format to output data described by an output schema in a second data format, wherein the sequence of data transformation steps include operations on nodes of data from the input data that map results of the sequence of data transformation steps to the selected view, wherein the first data format has text delimited data or a database file and wherein the second data format defines a hierarchical representation of nodes that represent data and a relationship of data content.

16. The method of claim 15, wherein creating the job comprises:
   receiving a mapping of the nodes in the input schema to nodes in the selected view; and
   using the mapping to map the input data in the first data format into the nodes of the selected view, wherein the nodes of the selected view are mapped to output data in the second data format comprising a structured document defining elements corresponding to the subset of nodes in the selected view.

17. The method of claim 15, wherein the selected view is used to parse the input data and generate a hierarchical representation of the data described by the selected view.

18. The method of claim 15, wherein the sequence of data transformation steps comprise composing steps using different views from the input schema.

19. The method claim 18, wherein the sequence of data transformation steps include join operations on the nodes of data from the input data to map results of the join operations to the selected view, and wherein the composing steps perform merging of the results of the join operations mapped to the selected view and maps the results to the selected view.

20. The method of claim 15, wherein the selected view used in the job includes a chunked node, wherein the sequence of data transformation steps comprises including all data and nodes in a tree of nodes from the chunked node into a string stored at the chunk node, and wherein the chunked node and the string map to one of the nodes in the output data.

* * * * *